US011601906B2

(12) United States Patent
Sengupta et al.

(10) Patent No.: US 11,601,906 B2
(45) Date of Patent: Mar. 7, 2023

(54) DOWNLINK SYNCHRONIZATION FOR NON-TERRESTRIAL WIRELESS COMMUNICATIONS

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Liangping Ma, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/348,491

(22) Filed: Jun. 15, 2021

(65) Prior Publication Data

US 2022/0007320 A1    Jan. 6, 2022

Related U.S. Application Data

(60) Provisional application No. 63/047,247, filed on Jul. 1, 2020.

(51) Int. Cl.
*H04W 56/00*    (2009.01)
*H04W 76/30*    (2018.01)

(52) U.S. Cl.
CPC ....... *H04W 56/0015* (2013.01); *H04W 76/30* (2018.02)

(58) Field of Classification Search
CPC ... H04B 7/185; H04W 56/0015; H04W 76/30

USPC ......................................................... 370/329
See application file for complete search history.

(56) References Cited

U.S. PATENT DOCUMENTS

| | | | |
|---|---|---|---|
| 2020/0052782 A1 | 2/2020 | Wang et al. | |
| 2020/0245341 A1* | 7/2020 | Wu | H04W 72/02 |
| 2020/0305188 A1* | 9/2020 | Liu | H04W 56/0005 |
| 2020/0351957 A1* | 11/2020 | Kim | H04W 74/0866 |
| 2021/0029679 A1* | 1/2021 | Si | H04L 1/1825 |

(Continued)

FOREIGN PATENT DOCUMENTS

| | | |
|---|---|---|
| EP | 3893537 A1 | 10/2021 |
| WO | WO-2019097922 A1 | 5/2019 |
| WO | WO-2020114276 A1 | 6/2020 |

OTHER PUBLICATIONS

International Search Report and Written Opinion—PCT/US2021/037689—ISA/EPO—dated Nov. 9, 2021.

*Primary Examiner* — Robert J Lopata
(74) *Attorney, Agent, or Firm* — Holland & Hart LLP

(57) ABSTRACT

Methods, systems, and devices for wireless communications are described. A narrowband internet of things (NB-IoT) user equipment (UE) associated with a non-terrestrial wireless network may identify a first synchronization procedure that is specific to the non-terrestrial network and different from synchronization procedures specific to terrestrial networks. In some cases, the UE may identify a different channel raster or may receive an indication of a true frequency of operation of a narrowband cell in the non-terrestrial network. The UE may identify the narrowband cell associated with the non-terrestrial network and may synchronize with the network using the identified synchronization procedure.

30 Claims, 16 Drawing Sheets

(56) References Cited

U.S. PATENT DOCUMENTS

| | | | |
|---|---|---|---|
| 2021/0175964 A1 | 6/2021 | Kusashima et al. | |
| 2021/0194571 A1* | 6/2021 | Ma | H04B 7/18504 |
| 2021/0250885 A1* | 8/2021 | Medles | H04L 27/0014 |
| 2021/0385773 A1* | 12/2021 | Ma | H04B 7/1851 |
| 2022/0159741 A1* | 5/2022 | Hoang | H04W 72/0453 |
| 2022/0264501 A1* | 8/2022 | Zhang | H04W 56/00 |
| 2022/0286198 A1* | 9/2022 | Khan | H04W 56/0045 |
| 2022/0286256 A1* | 9/2022 | Zhang | H04W 56/00 |
| 2022/0330184 A1* | 10/2022 | Lei | H04W 72/0453 |
| 2022/0338150 A1* | 10/2022 | Zhang | H04W 56/001 |

* cited by examiner

DOWNLINK SYNCHRONIZATION FOR NON-TERRESTRIAL WIRELESS COMMUNICATIONS

CROSS REFERENCE

The present Applicant for patent claims the benefit of U.S. Provisional Patent Application No. 63/047,247 by SENGUPTA et al., entitled "DOWNLINK SYNCHRONIZATION FOR NON-TERRESTRIAL WIRELESS COMMUNICATIONS," filed Jul. 1, 2020, assigned to the assignee hereof, and expressly incorporated by reference herein.

FIELD OF TECHNOLOGY

The following relates generally to wireless communications and more specifically to downlink synchronization for non-terrestrial wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications networks may be narrowband (NB) internet of things (IoT) networks supporting non-terrestrial communications. NB-IoT non-terrestrial networks may have characteristics different from those of terrestrial networks. As such, conventional signaling techniques for terrestrial networks may not be suitable or efficient when implemented in a non-terrestrial network.

SUMMARY

The described techniques relate to improved methods, systems, devices, and apparatuses that support downlink synchronization for wireless communications such as non-terrestrial narrowband (NB) internet of things (NB-IoT) communications. Generally, the described techniques provide for increasing the likelihood that a user equipment (UE) establishes communications with a NB cell within a non-terrestrial wireless network. Some NB-IoT networks may support various synchronization techniques to facilitate communications between devices in the network. Such synchronization techniques may also increase communications reliability in the non-terrestrial NB-IoT network, which may be associated with higher error due to characteristics of the non-terrestrial network (e.g., higher frequencies of operation, Doppler effects, increased distance between devices) that are different from a terrestrial network. A non-terrestrial UE may identify a first synchronization procedure that is specific to the non-terrestrial network and different from synchronization procedures specific to terrestrial networks. For example, the UE may identify a different channel raster or the UE may receive an indication of a true frequency of operation of a NB cell. The UE may identify the NB cell associated with the non-terrestrial network and may synchronize with the NB cell using the identified synchronization procedure.

A method for wireless communications at a UE is described. The method may include identifying a first synchronization procedure that is specific to non-terrestrial networks and different from a second synchronization procedure that is specific to terrestrial networks, identifying a cell associated with a non-terrestrial network for synchronization with the UE, and synchronizing with the identified cell by performing the identified synchronization procedure.

An apparatus for wireless communications at a UE is described. The apparatus may include a processor, memory coupled with the processor, and instructions stored in the memory. The instructions may be executable by the processor to cause the apparatus to identify a first synchronization procedure that is specific to non-terrestrial networks and different from a second synchronization procedure that is specific to terrestrial networks, identify a cell associated with a non-terrestrial network for synchronization with the UE, and synchronize with the identified cell by performing the identified synchronization procedure.

Another apparatus for wireless communications at a UE is described. The apparatus may include means for identifying a first synchronization procedure that is specific to non-terrestrial networks and different from a second synchronization procedure that is specific to terrestrial networks, means for identifying a cell associated with a non-terrestrial network for synchronization with the UE, and means for synchronizing with the identified cell by performing the identified synchronization procedure.

A non-transitory computer-readable medium storing code for wireless communications at a UE is described. The code may include instructions executable by a processor to identify a first synchronization procedure that is specific to non-terrestrial networks and different from a second synchronization procedure that is specific to terrestrial networks, identify a cell associated with a non-terrestrial network for synchronization with the UE, and synchronize with the identified cell by performing the identified synchronization procedure.

In some examples of the method, apparatuses, and non-transitory computer-readable medium described herein, identifying the first synchronization procedure may include operations, features, means, or instructions for identifying a first channel raster in frequency that may be specific to non-terrestrial networks and different from a second channel raster in frequency that may be specific to the terrestrial networks, identifying a set of one or more frequency locations of at least one anchor carrier in accordance with the first channel raster, and monitoring the at least one anchor carrier for one or more downlink synchronization signals, where synchronizing with the cell may be based on the one or more downlink synchronization signals.

In some examples of the method, apparatuses, and non-transitory computer-readable medium described herein, the first channel raster includes an increased cell carrier spacing in frequency with respect to the second channel raster.

Some examples of the method, apparatuses, and non-transitory computer-readable medium described herein may further include operations, features, means, or instructions for receiving an information block specific to non-terrestrial networks that includes an indication of a true value of a carrier frequency associated with the cell.

Some examples of the method, apparatuses, and non-transitory computer-readable medium described herein may further include operations, features, means, or instructions for comparing a first carrier frequency with the true value of the carrier frequency of the cell and selectively maintaining or dropping a connection with the cell based on the comparison.

In some examples of the method, apparatuses, and non-transitory computer-readable medium described herein, selectively maintaining or dropping the connection with the cell may include operations, features, means, or instructions for determining that the first carrier frequency matches the true value of the carrier frequency of the cell and maintaining the connection with the cell based on the first carrier frequency matching the true value of the carrier frequency.

In some examples of the method, apparatuses, and non-transitory computer-readable medium described herein, determining whether to maintain the connection with the cell may include operations, features, means, or instructions for determining that the first carrier frequency may be different from the true value of the carrier frequency of the cell and dropping the connection with the cell based on the first carrier frequency being different from the true value of the carrier frequency.

In some examples of the method, apparatuses, and non-transitory computer-readable medium described herein, the information block including the indication of the true value of the carrier frequency further includes at least a portion of an absolute radio frequency channel number (ARFCN) for the cell.

In some examples of the method, apparatuses, and non-transitory computer-readable medium described herein, the information block may be a system information block (SIB) including at least the portion of the ARFCN.

In some examples of the method, apparatuses, and non-transitory computer-readable medium described herein, the information block includes a master information block (MIB).

In some examples of the method, apparatuses, and non-transitory computer-readable medium described herein, the MIB includes a set of multiple least significant bits of the ARFCN.

Some examples of the method, apparatuses, and non-transitory computer-readable medium described herein may further include operations, features, means, or instructions for identifying a valid mapping between an ARFCN and a cell identifier (ID) associated with the cell, where synchronizing with the identified cell may be based on the valid mapping.

Some examples of the method, apparatuses, and non-transitory computer-readable medium described herein may further include operations, features, means, or instructions for determining that the valid mapping includes a first association between an odd numbered ARFCN and an odd numbered cell ID or a second association between an even numbered ARFCN and an even numbered cell ID.

Some examples of the method, apparatuses, and non-transitory computer-readable medium described herein may further include operations, features, means, or instructions for receiving one or more synchronization signals associated with the first synchronization procedure, where the one or more synchronization signals include narrow-band synchronization signals.

In some examples of the method, apparatuses, and non-transitory computer-readable medium described herein, the cell may be a narrowband cell that serves one or more NB-IoT specific UEs.

A method for wireless communications at a base station is described. The method may include identifying a first synchronization procedure that is specific to non-terrestrial networks and different from a second synchronization procedure that is specific to terrestrial networks, identifying a UE associated with a non-terrestrial network for synchronization with a cell associated with the base station, and synchronizing with the identified UE by performing the identified synchronization procedure.

An apparatus for wireless communications at a base station is described. The apparatus may include a processor, memory coupled with the processor, and instructions stored in the memory. The instructions may be executable by the processor to cause the apparatus to identify a first synchronization procedure that is specific to non-terrestrial networks and different from a second synchronization procedure that is specific to terrestrial networks, identify a UE associated with a non-terrestrial network for synchronization with a cell associated with the base station, and synchronize with the identified UE by performing the identified synchronization procedure.

Another apparatus for wireless communications at a base station is described. The apparatus may include means for identifying a first synchronization procedure that is specific to non-terrestrial networks and different from a second synchronization procedure that is specific to terrestrial networks, means for identifying a UE associated with a non-terrestrial network for synchronization with a cell associated with the base station, and means for synchronizing with the identified UE by performing the identified synchronization procedure.

A non-transitory computer-readable medium storing code for wireless communications at a base station is described. The code may include instructions executable by a processor to identify a first synchronization procedure that is specific to non-terrestrial networks and different from a second synchronization procedure that is specific to terrestrial networks, identify a UE associated with a non-terrestrial network for synchronization with a cell associated with the base station, and synchronize with the identified UE by performing the identified synchronization procedure.

In some examples of the method, apparatuses, and non-transitory computer-readable medium described herein, identifying the first synchronization procedure may include operations, features, means, or instructions for identifying a first channel raster in frequency that may be specific to non-terrestrial networks and different from a second channel raster in frequency that may be specific to the terrestrial networks, identifying a set of one or more frequency locations of at least one anchor carrier in accordance with the first channel raster, and transmitting the at least one anchor carrier including one or more downlink synchronization signals, where synchronizing with the UE may be based on the one or more downlink synchronization signals.

In some examples of the method, apparatuses, and non-transitory computer-readable medium described herein, the first channel raster includes an increased cell carrier spacing in frequency with respect to the second channel raster.

Some examples of the method, apparatuses, and non-transitory computer-readable medium described herein may further include operations, features, means, or instructions for transmitting an information block specific to non-terrestrial networks that includes an indication of a true value of a first carrier frequency associated with the cell.

Some examples of the method, apparatuses, and non-transitory computer-readable medium described herein may further include operations, features, means, or instructions for compare a first carrier frequency with the true value of the carrier frequency of the cell and selectively maintaining or dropping a connection with the UE based on a comparison of the first carrier frequency with the true value of the carrier frequency of the cell.

In some examples of the method, apparatuses, and non-transitory computer-readable medium described herein, selectively maintaining or dropping the connection with the cell may include operations, features, means, or instructions for maintaining the connection with the UE based on the first carrier frequency matching the true value of the carrier frequency.

In some examples of the method, apparatuses, and non-transitory computer-readable medium described herein, determining whether to maintain the connection with the cell may include operations, features, means, or instructions for dropping the connection with the UE based on the first carrier frequency being different from the true value of the carrier frequency.

Some examples of the method, apparatuses, and non-transitory computer-readable medium described herein may further include operations, features, means, or instructions for transmitting the information block further including at least a portion of an ARFCN for the cell to indicate the true value of the carrier frequency.

In some examples of the method, apparatuses, and non-transitory computer-readable medium described herein, the information block includes an MIB, the MIB including a set of multiple least significant bits of the ARFCN.

In some examples of the method, apparatuses, and non-transitory computer-readable medium described herein, the information block may be an SIB including the ARFCN.

Some examples of the method, apparatuses, and non-transitory computer-readable medium described herein may further include operations, features, means, or instructions for identifying a valid mapping between an ARFCN and a cell ID associated with the cell, where synchronizing with the UE may be based on the valid mapping and determining that the valid mapping includes a first association between an odd numbered ARFCN and an odd numbered cell ID or a second association between an even numbered ARFCN and an even numbered cell ID.

Some examples of the method, apparatuses, and non-transitory computer-readable medium described herein may further include operations, features, means, or instructions for transmitting one or more synchronization signals associated with the first synchronization procedure, where the one or more synchronization signals include narrow-band synchronization signals.

In some examples of the method, apparatuses, and non-transitory computer-readable medium described herein, the base station serves one or more NB-IoT specific UEs.

DETAILED DESCRIPTION

Figure 1:
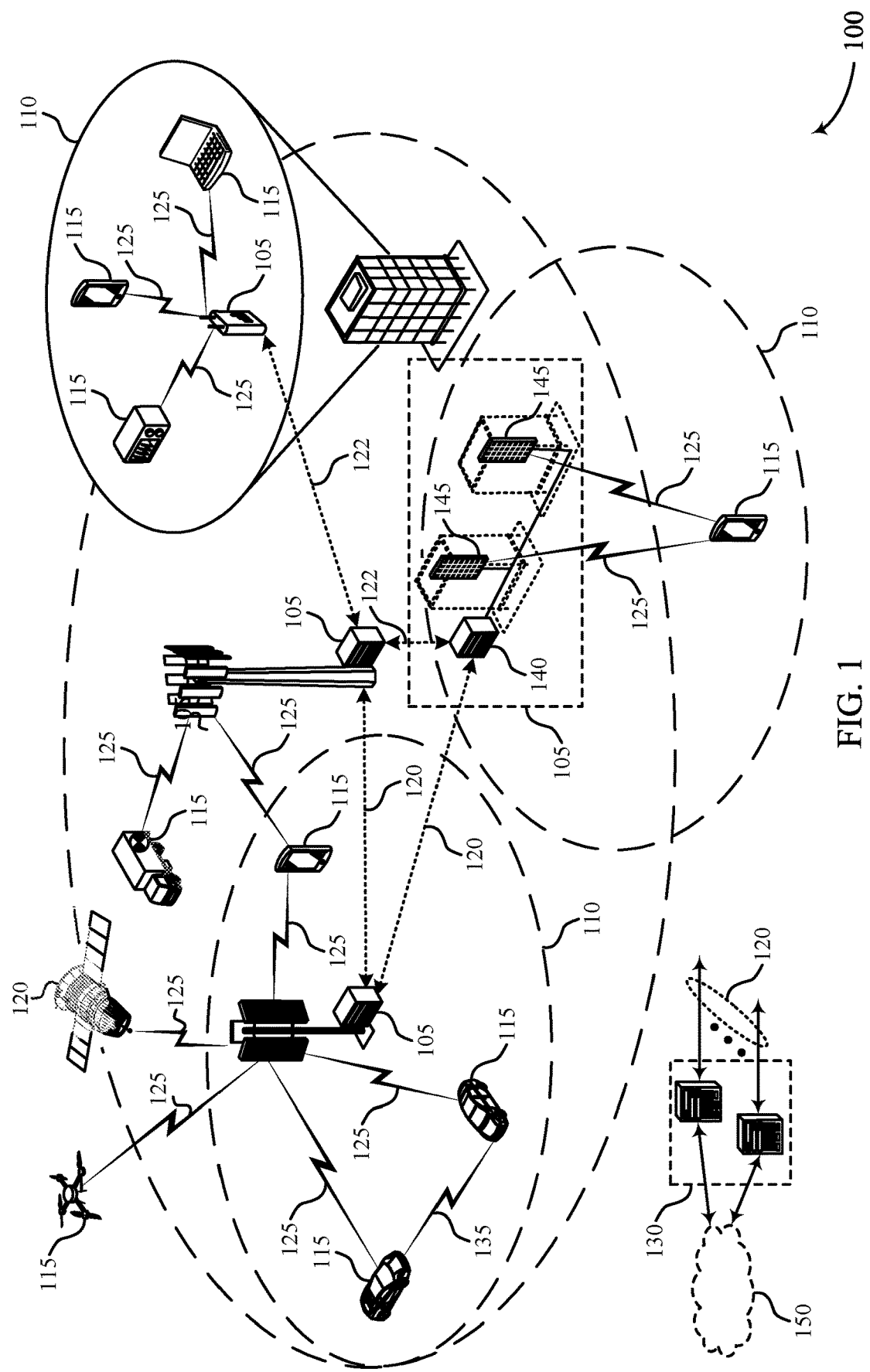
FIG. 1 illustrates an example of a wireless communications system that supports downlink synchronization for non-terrestrial wireless communications in accordance with aspects of the present disclosure.

Some wireless communications networks such as narrowband (NB) internet of things (NB-IoT) networks may support various synchronization techniques to facilitate communications between devices in the network. One such technique employs the use of a channel raster, which may indicate an index of frequency locations that a user equipment (UE) may use to search for an anchor carrier, or an NB-IoT resource block used for initial synchronization during cell acquisition. The anchor carrier may include various downlink synchronization signals located at an interval given by the frequency locations of the channel raster that the UE may use for synchronization.

In terrestrial NB-IoT deployments, a UE may estimate the frequency of a carrier during an initial synchronization process, along with an initial frequency estimation error associated with the initial frequency estimate. In some examples, the initial frequency estimation error is small enough (e.g., relative to the total frequency estimation) that a UE may accurately estimate the frequency of a carrier and, in some cases, establish communications with the terrestrial NB-IoT cell. That is, the channel raster for terrestrial systems may be large enough (e.g., relative to the frequency estimation error) that the UE may accurately estimate the actual carrier frequency and establish communications with the terrestrial NB cell.

In non-terrestrial deployments, however, the initial frequency estimation error for a UE may be much larger relative to error measured in terrestrial systems due to higher frequencies of operation, Doppler shift effects, and other factors such as UE movement in the non-terrestrial network. Based on the characteristics of non-terrestrial communications (e.g., long distances between the UE and the satellite, satellite orbital movement, interference, and Doppler effects), the UE in a non-terrestrial network may incorrectly estimate a frequency for an NB-IoT carrier, and may attempt to establish a connection with the NB cell using the incorrectly estimated frequency. The UE may then expect to receive communications from the NB cell on the incorrectly estimated frequency, which is different from the frequency that the cell is operating on. Such mismatch in the frequency that the UE expects to receive and the actual transmitted frequency may introduce communication challenges (e.g., lost or dropped transmissions) when operating non-terrestrial networks.

To increase communications efficiency and to effectively reduce the effects of larger error and large initial channel frequency offsets in a non-terrestrial network, the network may implement a number of different techniques to increase the likelihood that the UE may effectively connect with the correct NB cell and that the UE may estimate the correct frequency associated with the NB cell. In one example, the frequency spacing associated with the channel raster for the non-terrestrial NB-IoT network may be increased such that the spacing between valid NB-IoT anchor carrier locations are increased with respect to those in a terrestrial network, and the UE may search for NB-IoT anchor carriers at frequency locations designated by the channel raster.

In another example, the UE may establish communications with the NB cell and may receive a master information block (MIB) or a system information block (SIB) that is specific to non-terrestrial network communications, and that includes information such as an indication of a true value of the NB-IoT anchor carrier frequency associated with the NB cell. For example, the MIB or a SIB may include at least a portion of an absolute radio frequency channel number (ARFCN) that indicates the frequency for the cell. The UE may use the ARFCN to determine that the frequency of operation of the NB cell is different from the frequency that the UE expects to be transmitted, and the UE may disconnect from the cell and attempt to synchronize with a different NB cell.

In another example, a non-terrestrial network may restrict the number of NB cell IDs that can be used for each ARFCN based on a valid mapping between the NB cell IDs and the ARFCN. In some examples, even-numbered ARFCNs may be associated with even-numbered NB cell IDs, and odd-numbered ARFCNs may be associated with odd-numbered cell IDs, although other valid mappings are possible.

Aspects of the disclosure are initially described in the context of wireless communications systems, including non-terrestrial wireless communications systems. Aspects of the disclosure are further illustrated by and described with reference to apparatus diagrams, system diagrams, process flow diagrams, and flowcharts that relate to downlink synchronization for non-terrestrial wireless communications.

FIG. 1 illustrates an example of a wireless communications system 100 that supports downlink synchronization for non-terrestrial wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 122 (e.g., via an S1, N2, N3, or other interface). The base stations 105 may communicate with one another over the backhaul links 122 (e.g., via an X2, Xn, or other interface) either directly (e.g., directly between base stations 105), or indirectly (e.g., via core network 130), or both. In some examples, the backhaul links 122 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of one or more radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) ARFCN (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of one or more carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may contain one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of one or more UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to NB communications), or a combination of these techniques. For example, some UEs 115 may be configured for operation using a NB protocol type that is associated with a defined portion or range (e.g., a set of one or more subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some examples, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120 or other non-terrestrial devices. Satellite 120 may communicate with base stations 105 (also referred to as gateways in non-terrestrial networks) and UEs 115 (or other high altitude or terrestrial communications devices). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, or any combination thereof. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105, act as a bent-pipe satellite, act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites or may be configured to be reprogrammed). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite but may also use on-board processing to perform other functions. Examples of these other functions may include demodulating a received signal, decoding a received signal, re-encoding a signal to be transmitted, modulating the signal to be transmitted, or a combination thereof. For example, a bent-pipe satellite (e.g., satellite 120) may receive a signal from a base station 105 and may relay the signal to a UE 115 or base station 105, or vice-versa.

Some wireless communications networks such as NB-IoT networks may support various synchronization techniques to facilitate communications between devices in the network. One such technique employs the use of a channel raster, which may indicate an index of frequency locations that a UE 115 or a satellite 120 may use to search for an anchor carrier for initial synchronization with wireless communications system 100.

In terrestrial NB-IoT deployments, a UE 115 may estimate the frequency of a carrier and an initial frequency estimation error associated with the initial frequency estimate. In most examples, the initial frequency estimation error is small enough that the UE may accurately estimate the frequency of a carrier and the UE may synchronize with the terrestrial NB-IoT cell using an identified synchronization procedure. In non-terrestrial deployments, however, the initial frequency estimation error for the UE 115 may be much larger due to higher frequencies of operation, Doppler shift effects, and other factors. As such, the UE in a non-terrestrial network may incorrectly estimate the frequency for an NB-IoT carrier, and may attempt to connect with the NB cell using the incorrectly estimated frequency.

The network may implement a number of synchronization techniques to increase the likelihood that the UE 115 may effectively connect with the correct NB cell and correctly estimate the frequency associated with the NB cell. In one example, the frequency spacing associated with the channel raster for the non-terrestrial NB-IoT network may be increased such that the spacing between valid NB-IoT anchor carrier locations are increased with respect to those in a terrestrial network. In another example, the UE 115 may receive an ARFCN that indicates the frequency for the cell, and may use the ARFCN to determine whether the frequency supported by the NB cell is the same or different from the frequency that the UE 115 expects to be transmitted by the NB cell. In another example, a non-terrestrial network may restrict the number of NB cell IDs that can be used for each ARFCN based on a valid mapping between the NB cell IDs and the ARFCN.

Figure 2:
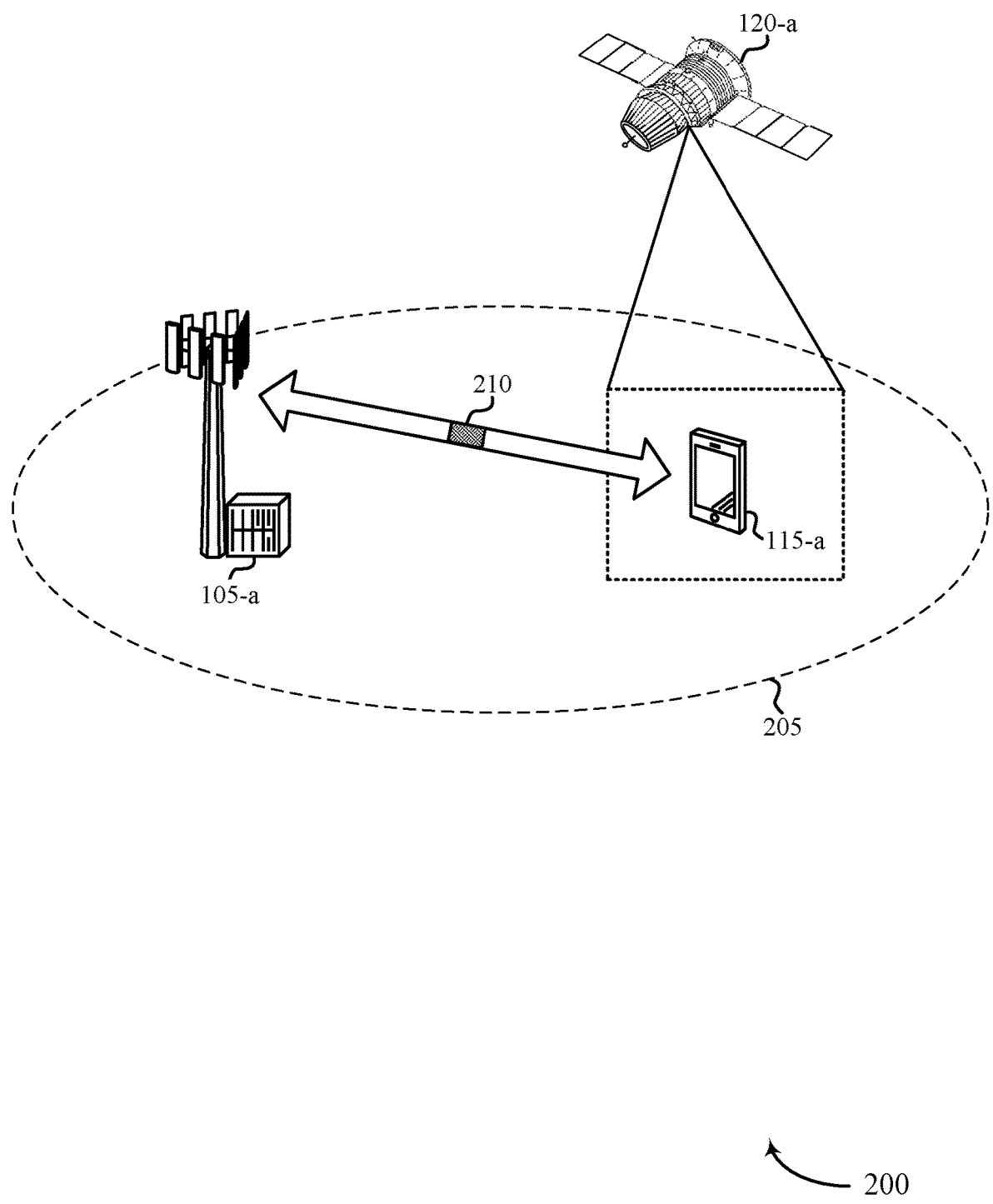
FIG. 2 illustrates an example of a wireless communications system that supports downlink synchronization for non-terrestrial wireless communications in accordance with aspects of the present disclosure.

FIG. 2 illustrates an example of a wireless communications system 200 that supports downlink synchronization for non-terrestrial wireless communications in accordance with aspects of the present disclosure. In some examples, wireless communications system 200 may implement aspects of wireless communication system 100. For example, wireless communications system 200 may be associated with non-terrestrial NB-IoT communications between a base station 105-a and a non-terrestrial UE 115-a such as satellite 120-a, each of which may be examples of base stations 105, UEs 115, and satellites 120 described with reference to FIG. 1.

Some wireless communications networks such as NB-IoT networks may support various synchronization techniques to facilitate communications between devices in the network. One such technique employs the use of a channel raster, which may indicate an index of frequency locations that a UE 115-a can use to search for an anchor carrier (e.g., an initial synchronization NB-IoT resource block) during cell acquisition processes. More specifically, the channel raster may provide a range of frequency positions of an NB-IoT anchor carrier which carries downlink synchronization signals or channels (e.g., an NB-IoT reference signal (NRS), an NB-IoT primary synchronization signal (NPSS), an NB-IoT secondary synchronization signal (NSSS), an NB-IoT physical broadcast channel (NPBCH), an NB-IoT physical downlink shared channel (NPDSCH), or an NB-IoT physical downlink control channel (NPDCCH)) that the UE 115-a may use for synchronization with an NB-IoT cell 205. In the example of a 100 kHz channel raster, the NB-IoT anchor carrier may be located at resource block locations in accordance with the channel raster (e.g., one anchor carrier every 100 kHz).

The channel raster may be associated with a given raster offset (e.g., +/−7.5 kHz for a 100 kHz raster) such that the NB-IoT anchor carrier is located at a frequency that varies from the raster by up to the raster offset (e.g., represented as M×100 kHz+$R_{offset}$. The raster offset may account for possible errors in the frequency estimation by the UE 115-a or possible errors of the placement of the NB-IoT frequency carriers (e.g., NB-IoT anchor carriers or non-anchor carriers). In addition, the raster offset may be different for different NB-IoT systems (e.g., up to 7.5 kHz for in-band or guard band deployments, and 0 kHz for standalone deployments).

In terrestrial NB-IoT deployments, a UE 115-a may estimate the frequency of a carrier during an initial synchronization process and an initial frequency estimation error associated with the initial frequency estimate. In most examples, the initial frequency estimation error is small enough that a UE 115-a may accurately estimate the frequency of a carrier. After estimating the frequency, the UE 115-a may successfully "lock on" (e.g., establish a connection) to a NB-IoT cell. In other words, the actual frequency that the UE 115-a estimates for a cell plus the raster offset and initial frequency error for terrestrial systems may be small enough that the UE 115-a may not mistake the operating frequency of the cell for that of a different cell transmitting at a different frequency. Therefore, in most terrestrial systems, the UE 115-a may accurately estimate the carrier frequency and may synchronize or otherwise establish communications with the terrestrial NB cell.

In non-terrestrial deployments such as in wireless communications system 200, however, the initial frequency estimation error for a UE 115-a may be much larger due to higher frequencies of operation, Doppler effects, and UE movement in the non-terrestrial network. For example, the UE 115-a may be a non-terrestrial UE such as a satellite 120-a (or a UE 115-a located at the satellite 120-a), or any other non-terrestrial device which establishes communications with the NB cell 205. Based on the characteristics of non-terrestrial communications (e.g., longer distances between devices, orbital movement, interference, Doppler effects), the UE 115-a may incorrectly estimate the frequency for an NB-IoT carrier, and may attempt to lock on to the NB cell using the incorrectly estimated frequency. The UE 115-a may then expect to receive communications from the base station 105-a on the incorrectly estimated frequency, which is different from the frequency used by the base station 105-a. Such a mismatch between the frequency that the UE 115-a expects to receive and the actual frequency used by the base station 105-a on the NB cell 205 may cause the UE 115-a to lose synchronization with the base station 105-a and, in some cases, drop communications on the NB cell 205.

Various differences between non-terrestrial networks and terrestrial networks may further increase the ability of the UE 115-a to accurately estimate the frequency of an NB-IoT carrier during a synchronization procedure. For example, the initial frequency error estimated by the UE 115-a in a non-terrestrial network may be larger than the error (e.g., 20 ppm error) assumed by a terrestrial network. In addition, non-terrestrial or satellite-based communications may operate in an "S" band or higher-level bands, which may be associated with significantly higher frequencies than terrestrial NB-IoT carrier frequencies. These higher frequencies of operation may increase the likelihood of error. For example, UEs in a non-terrestrial network may have an initial frequency error of up to 47.5 kHz (e.g., (20 ppm error)×(2 GHz carrier frequency)+(7.5 kHz offset that is present in the system)) in the S band mode of operation, which may be larger than a 25.5. kHz initial channel frequency offset for terrestrial systems that operate at a carrier frequency of 900 MHz.

To increase communications efficiency and to effectively mitigate the effects of larger error and large initial channel frequency offsets in a non-terrestrial network, the network may implement a number of different techniques to increase the likelihood that the UE 115-a can effectively lock onto the correct NB cell and estimate the correct frequency associated with the NB cell.

In one example, the frequency spacing associated with the channel raster for the non-terrestrial NB-IoT network may be increased such that the spacing between valid NB-IoT anchor carrier locations are increased with respect to those in a terrestrial network. For example, the non-terrestrial network may have an increased channel raster such that the UE 115-a searches for an NB-IoT anchor carrier in accordance with a larger frequency spacing (e.g., the NB-IoT anchor carrier may be located at 200 kHz compared to every 100 kHz for terrestrial systems). The channel raster for the non-terrestrial network may be a number of different values and may be configured or changed based on various network characteristics. In addition, the channel raster offset may be increased proportionally to the increase in the channel raster. Increasing the channel raster may account for the larger channel frequency offset and initial frequency error associated with communications in the non-terrestrial network.

In another example, the UE 115-a may establish communications with the NB cell 205 and may receive a MIB 210 from the base station 105-a. In some examples, the MIB may be transmitted in a NB downlink channel or in a SIB that the UE 115-a receives after locking onto the cell 205. The UE 115-a may identify information in the MIB such as an indication of a true value of the NB-IoT anchor carrier frequency associated with the cell 205. For example, the MIB or a SIB may include an ARFCN that indicates the frequency for the cell. The MIB or the SIB may include the full ARFCN or a portion of the ARFCN. For example, the MIB may include some least significant bits (LSBs) of the ARFCN which may indicate the NB-IoT carrier frequency of the cell 205.

In some examples, the UE 115-a may use the ARFCN to determine that the frequency transmitted by the base station 105-a on the cell 205 is different from the operating frequency expected by the UE 115-a (based on the initial frequency estimation for the cell). In some cases, if the UE 115-a determines such a mismatch in frequency, the UE 115-a may disconnect from the cell and attempt synchronization with a different NB cell.

In another example, the frequency locations indicated by the ARFCN at which a given NB cell ID may be located in the non-terrestrial network may be restricted with respect to the terrestrial network. For example, a non-terrestrial network may restrict the number of NB cell IDs that can be used for each ARFCN. For example, even-numbered ARFCN may be associated with even-numbered NB cell IDs, and odd-numbered ARFCN may be associated with odd-numbered cell IDs. In such examples, if the UE 115-a locks on to an odd ARFCN, but measures an even carrier location, the UE 115-a may determine that the UE 115-a has incorrectly measured the frequency of the cell, and may disconnect from the cell. Different mappings between ARFCNs and NB cell IDs may also be implemented. The mapping between ARFCNs and the NB cell IDs may increase network resilience to frequency offsets, and may increase the ability of the UE 115-*a* to select a correct cell based on initial frequency estimation in the non-terrestrial network.

Figure 3:
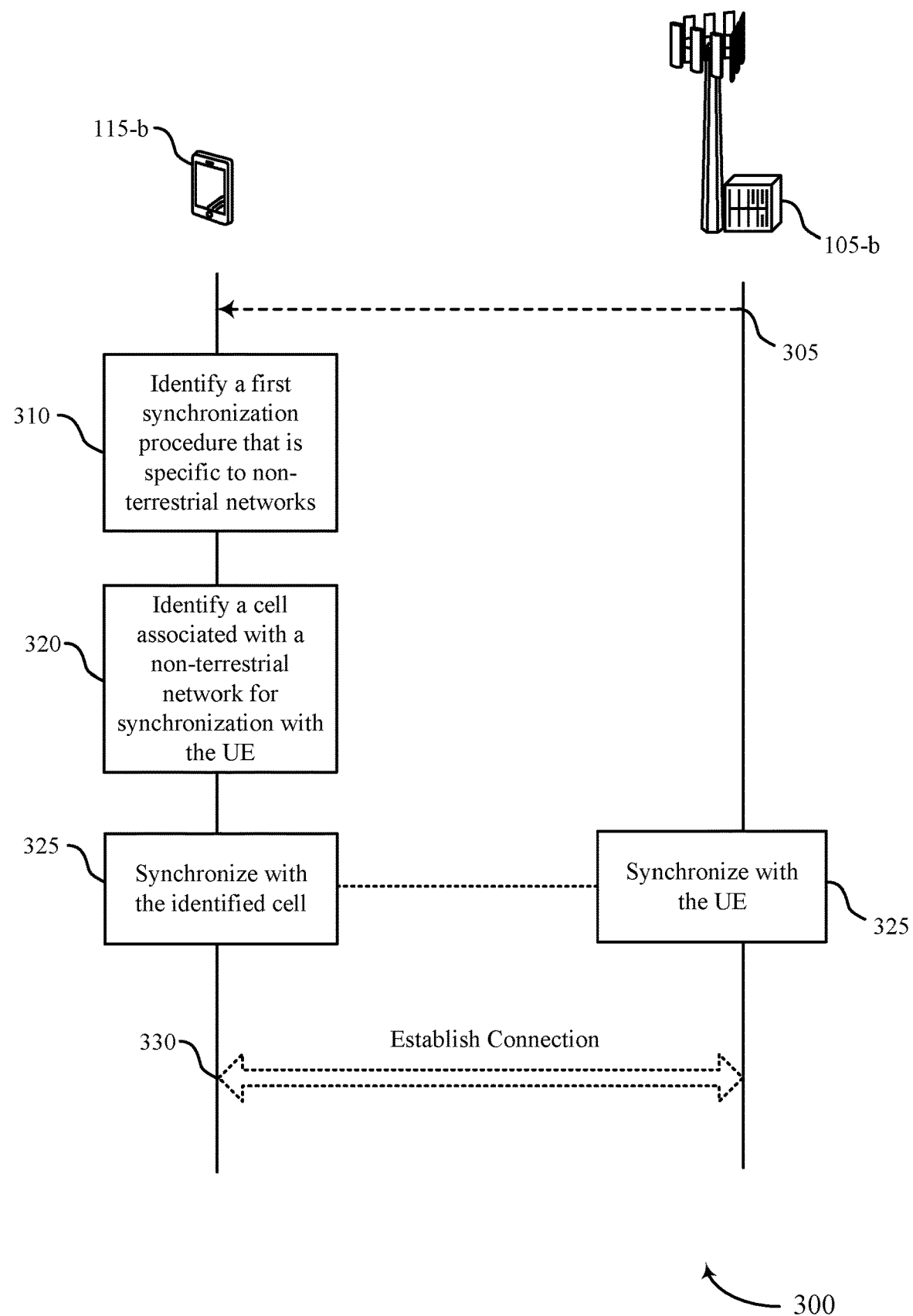
FIG. 3 illustrates an example of a process flow that supports downlink synchronization for non-terrestrial wireless communications in accordance with aspects of the present disclosure.

FIG. 3 illustrates an example of a process flow 300 that supports downlink synchronization for non-terrestrial wireless communications in accordance with aspects of the present disclosure. In some examples, process flow 300 may implement aspects of wireless communication system 100. For example, process flow 300 may be associated with non-terrestrial NB-IoT communications between a base station 105-*b* and a non-terrestrial UE 115-*b* such as a satellite, which may be examples of base stations 105 and UEs 115 described with reference to FIGS. 1 and 2. In some examples, the base station 105-*b* and the UE 115-*b* may be located in a NB cell that serves one or more NB-IoT specific UEs. In the following description of process flow 300, operations between the base station 105-*b* and the non-terrestrial UE 115-*b* as shown may be performed in a different order or at a different time. Some operations may also be omitted from process flow 300, and other operations may be added to process flow 300.

At 305, the base station 105-*b* may identify that the UE 115-*b* is associated with a non-terrestrial network and may determine a synchronization procedure that is specific to non-terrestrial networks. The base station 105-*b* may transmit an indication of the first synchronization procedure to the UE 115-*b*.

At 310, the UE 115-*b* may identify the first synchronization procedure specific to non-terrestrial networks, which may be different from a second synchronization procedure specific to terrestrial networks. For example, the UE 115-*b* may identify a first channel raster in frequency that is specific to the non-terrestrial network and different from a second channel raster in frequency that is specific to other terrestrial networks. For example, the first channel raster for the non-terrestrial network may have an NB-IoT cell carrier spacing that is increased with respect to the second channel raster for the terrestrial network.

The UE 115-*b* may identify a set of one or more frequency locations of at least one NB-IoT anchor carrier in accordance with the frequency locations of the first channel raster, and may monitor the set of one or more frequency locations for the anchor carrier. Once the UE 115-*b* receives the NB-IoT anchor carrier, the UE 115-*b* may identify one or more downlink synchronization signals (e.g., NPSS, NSSS, etc.) to use for synchronizing with the NB cell in accordance with the first synchronization procedure.

At 320, the UE 115-*b* may identify a NB cell associated with the NB-IoT network for synchronization and may synchronize with the identified cell at 325 based on the identified synchronization procedure.

In some examples, the UE 115-*b* may receive an information block (e.g., a MIB or a SIB) specific to non-terrestrial networks that includes an indication of a true value of a first NB-IoT anchor carrier associated with the NB cell. For example, the indication of the true value of the first NB-IoT anchor carrier frequency may be indicated in at least a portion of an ARFCN for the NB cell. The ARFCN may be partially or wholly included in the MIB or the SIB. In some cases, a number of LSBs of the ARFCN may be included.

The UE 115-*b* may compare a measured value of a first NB-IoT carrier frequency with the true value of the first NB-IoT anchor carrier and may selectively maintain or drop the connection with the cell based on the comparison. In some cases, the UE 115-*b* may determine that the measured value of the first NB-IoT carrier frequency matches the true value of the NB-IoT anchor carrier frequency of the NB cell, and the UE 115-*b* may maintain the connection with the NB cell based on the measured carrier frequency matching the true value of the NB-IoT anchor carrier frequency. In some other cases, the UE 115-*b* may determine that the measured value of the first NB-IoT carrier frequency differs from the true value of the NB-IoT anchor carrier frequency of the NB cell, and the UE 115-*b* may drop the connection with the NB cell based on the measured carrier frequency differing from the true value of the NB-IoT anchor carrier frequency.

In some examples, the UE 115-*b* may identify a valid mapping between the ARFCN and a NB cell ID associated with the NB cell, where synchronizing with the NB cell is based on the valid mapping. For example, the UE 115-*b* may determine that a first set of one or more NB cell IDs (e.g., even-valued NB cell IDs) is associated with a first ARFCN (e.g., even-valued ARFCN), and may determine that a second set of one or more NB cell IDs (e.g., odd-valued NB cell IDs) is associated with a second ARFCN (e.g., odd-valued NB cell IDs).

In some examples, the UE 115-*b* may identify the mapping as a number of candidate sets of ARFCNs and cell IDs. For example, odd ARFCNs may be mapped to odd cell IDs and even ARFCNs may be mapped to even cell IDs, although other valid mappings between cell IDs and ARFCNs are possible. In cases where the UE 115-*b* determines (e.g., from NPSS and NSSS) that the NB cell ID is odd, but estimates that the carrier frequency corresponds to an even ARFCN, the UE 115-*b* may consider the pair (cell ID, estimated ARFCN) as invalid, and may disconnect from the cell.

At 330, the UE 115-*b* may synchronize with the NB cell based on the synchronization procedure. For example, the UE 115-*b* may establish communications based on receiving one or more NB synchronization signals associated with the first synchronization procedure. In some cases, the UE 115-*b* may optionally establish communications based on determining that the UE 115-*b* has accurately determined the frequency associated with the NB cell.

Figure 4:
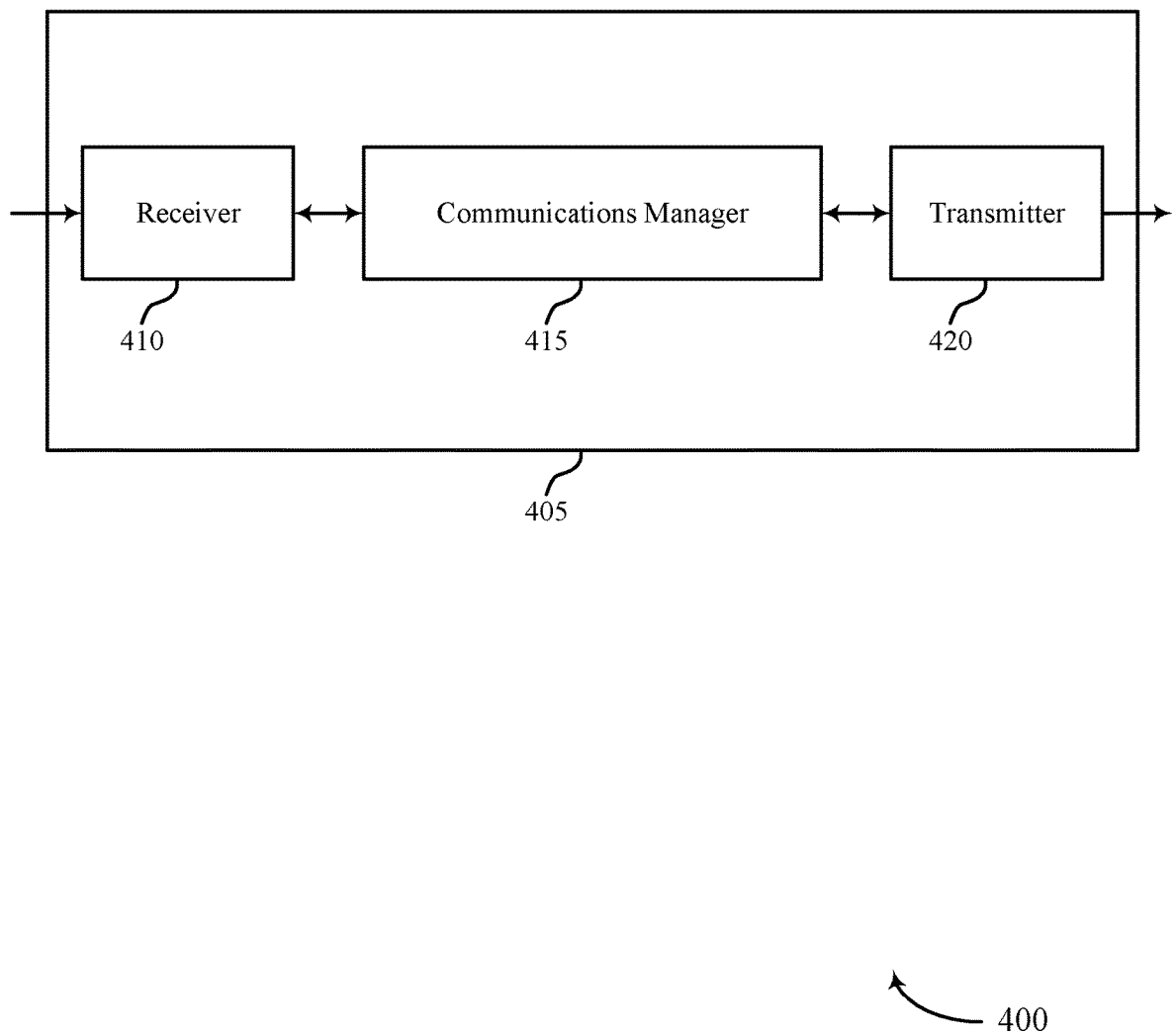
FIGS. 4 and 5 show block diagrams of devices that support downlink synchronization for non-terrestrial wireless communications in accordance with aspects of the present disclosure.

FIG. 4 shows a block diagram 400 of a device 405 that supports downlink synchronization for non-terrestrial wireless communications in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to downlink synchronization for non-terrestrial wireless communications, etc.). Information may be passed on to other components of the device 405. The receiver 410 may be an example of aspects of the transceiver 720 described with reference to FIG. 7. The receiver 410 may utilize a single antenna or a set of one or more antennas.

The communications manager 415 may identify a first synchronization procedure that is specific to non-terrestrial networks and different from a second synchronization procedure that is specific to terrestrial networks, synchronize with the identified cell by performing the identified synchronization procedure, and identify a cell associated with a non-terrestrial network for synchronization with the UE.

The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of one or more antennas.

Figure 5:
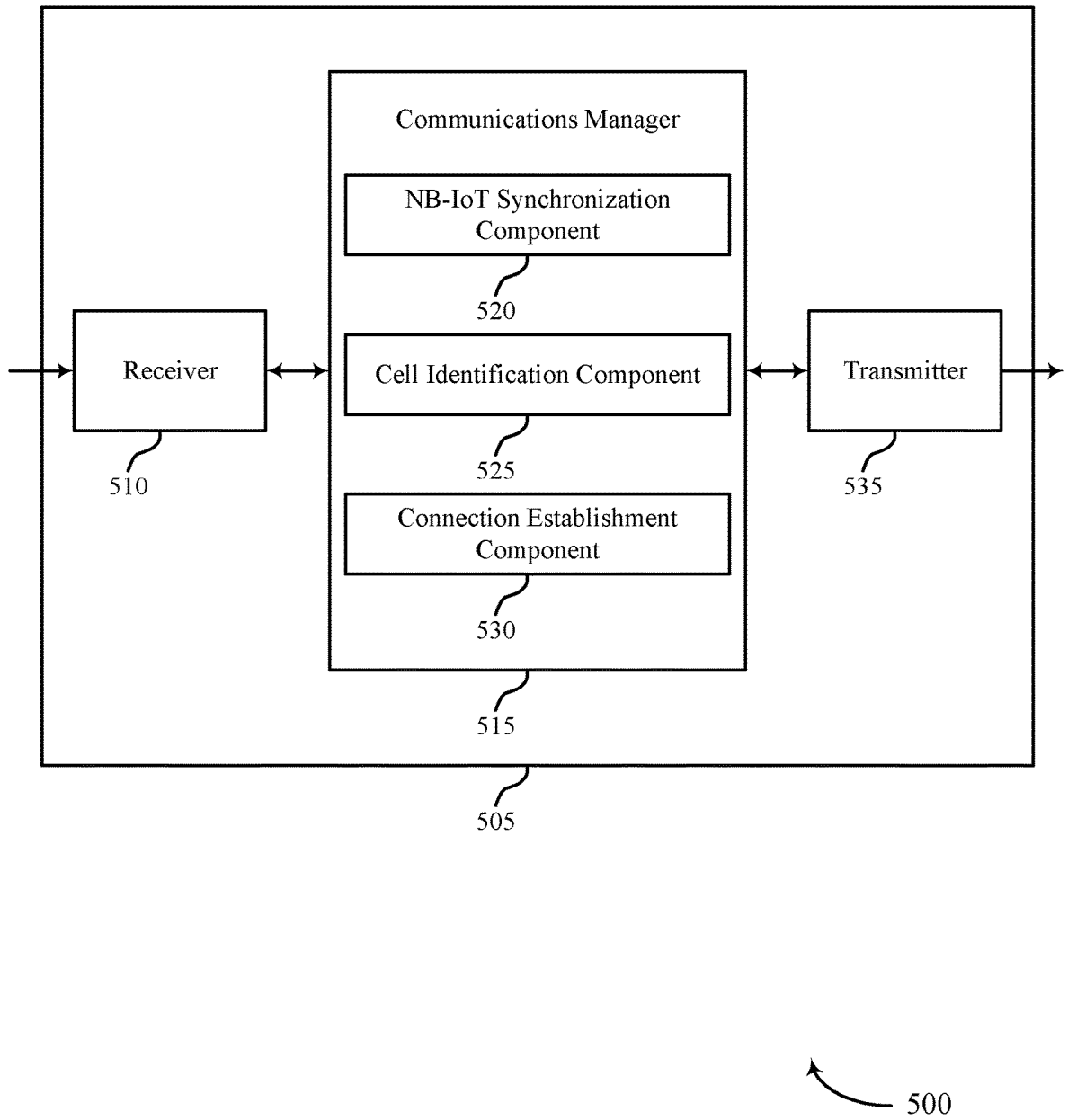

FIG. 5 shows a block diagram 500 of a device 505 that supports downlink synchronization for non-terrestrial wireless communications in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to downlink synchronization for non-terrestrial wireless communications, etc.). Information may be passed on to other components of the device 505. The receiver 510 may be an example of aspects of the transceiver 720 described with reference to FIG. 7. The receiver 510 may utilize a single antenna or a set of one or more antennas.

The communications manager 515 may be an example of aspects of the communications manager 415 as described herein. The communications manager 515 may include a NB-IoT synchronization component 520, a cell identification component 525, and a connection establishment component 530. The communications manager 515 may be an example of aspects of the communications manager 710 described herein.

The NB-IoT synchronization component 520 may identify a first synchronization procedure that is specific to non-terrestrial networks and different from a second synchronization procedure that is specific to terrestrial networks and synchronize with the identified cell by performing the identified synchronization procedure.

The cell identification component 525 may identify a cell associated with a non-terrestrial network for synchronization with the UE.

The connection establishment component 530 may in some cases establish a connection with the cell, or may otherwise synchronize with the cell.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of one or more antennas.

In some examples, communications manager 515 may be implemented as an integrated circuit or chipset for a mobile device modem, and the receiver 510 and transmitter 520 may be implemented as analog components (e.g., amplifiers, filters, antennas, etc.) coupled with the mobile device modem to enable wireless transmission and reception.

The communications manager 515 as described herein may be implemented to realize one or more potential advantages. Various implementations may enable the communications manager 515 to accurately estimate the frequency of a NB-IoT carrier and synchronize with a NB cell according to the estimated frequency. At least one implementation may enable communications manager 515 to effectively determine a synchronization procedure and a channel raster specific to non-terrestrial networks and implement channel monitoring in accordance with the non-terrestrial specific channel raster. In some other implementations, the communications manager 515 may be able to effectively determine that the communications manager 515 has connected with an incorrect NB-IoT cell and may disconnect according to the determination.

Based on implementing the synchronization techniques as described herein, one or more processors of the device 505 (e.g., processor(s) controlling or incorporated with one or more of receiver 510, communications manager 515, and transmitter 520) may reduce the number of cases where a device incorrectly estimates the NB-IoT carrier frequency associated with a NB cell. In addition, the synchronization techniques may reduce latency and increase communications efficiency in the network by limiting unsuccessful synchronization attempts. In addition, the techniques may allow for a device to more effectively identify if the device has incorrectly locked onto a NB cell.

Figure 6:
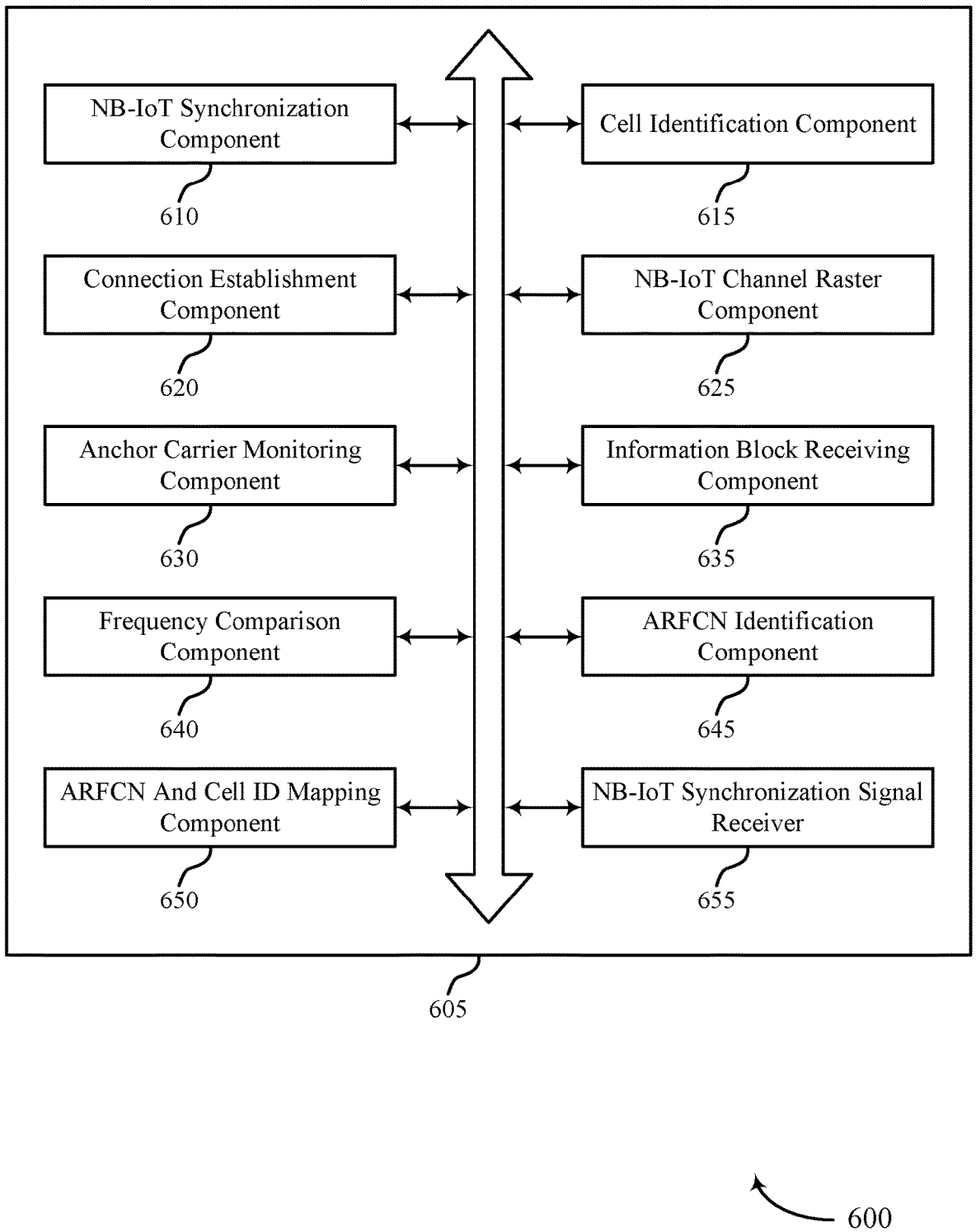
FIG. 6 shows a block diagram of a communications manager that supports downlink synchronization for non-terrestrial wireless communications in accordance with aspects of the present disclosure.

FIG. 6 shows a block diagram 600 of a communications manager 605 that supports downlink synchronization for non-terrestrial wireless communications in accordance with aspects of the present disclosure. The communications manager 605 may be an example of aspects of a communications manager 415, a communications manager 515, or a communications manager 710 described herein. The communications manager 605 may include a NB-IoT synchronization component 610, a cell identification component 615, a connection establishment component 620, a NB-IoT channel raster component 625, an anchor carrier monitoring component 630, an information block receiving component 635, a frequency comparison component 640, an ARFCN identification component 645, an ARFCN and cell ID mapping component 650, and a NB-IoT synchronization signal receiver 655. Each of these modules may communicate, directly or indirectly, with one another (e.g., via one or more buses).

The NB-IoT synchronization component 610 may identify a first synchronization procedure that is specific to non-terrestrial networks and different from a second synchronization procedure that is specific to terrestrial networks. The cell identification component 615 may identify a cell associated with a non-terrestrial network for synchronization with the UE.

In some examples, the NB-IoT synchronization component 610 may synchronize with the identified cell by performing the identified synchronization procedure. In some cases, the cell is a NB cell that serves one or more NB (NB) internet of things (IoT) specific UEs.

The connection establishment component 620 may establish a connection with the cell, or may otherwise synchronize with the cell based on the identified synchronization procedure.

The frequency comparison component 640 may compare a first carrier frequency with the true value of the carrier frequency of the cell. In some examples, the frequency comparison component 640 may determine that the first carrier frequency matches the true value of the carrier frequency of the cell. In some examples, the frequency comparison component 640 may determine that the first carrier frequency is different from the true value of the carrier frequency of the cell.

In some examples, the connection establishment component 620 may selectively maintain or drop the connection with the cell based on the comparison. For example, in some examples, the connection establishment component 620 may maintain the connection with the cell based on the first carrier frequency matching the true value of the carrier frequency. In some examples, the connection establishment component 620 may drop the connection with the cell based on the first carrier frequency being different from the true value of the carrier frequency.

The NB-IoT channel raster component 625 may identify a first channel raster in frequency that is specific to non-terrestrial networks and different from a second channel raster in frequency that is specific to the terrestrial networks. In some cases, the first channel raster may include an increased cell carrier spacing in frequency with respect to the second channel raster.

The anchor carrier monitoring component 630 may identify a set of one or more frequency locations of at least one anchor carrier in accordance with the first channel raster. In some examples, the anchor carrier monitoring component 630 may monitor the at least one anchor carrier for one or more downlink synchronization signals, where synchronizing with the cell is based on the one or more downlink synchronization signals.

The information block receiving component 635 may receive an information block specific to non-terrestrial networks that includes an indication of a true value of a carrier frequency associated with the cell. In some cases, the information block includes a MIB. In some cases, the true value of the first carrier frequency further may include at least a portion of an ARFCN for the cell. In some cases, the information block may be a SIB including the ARFCN. In some cases, the MIB may include a set of one or more least significant bits of the ARFCN. The ARFCN and cell ID mapping component 650 may identify a valid mapping between an ARFCN and cell ID associated with the cell. In some examples, the mapping component 650 may synchronize with the NB cell based on the valid mapping.

The NB-IoT synchronization signal receiver 655 may receive one or more synchronization signals associated with the first synchronization procedure, where the one or more synchronization signals include narrow-band synchronization signals.

Figure 7:
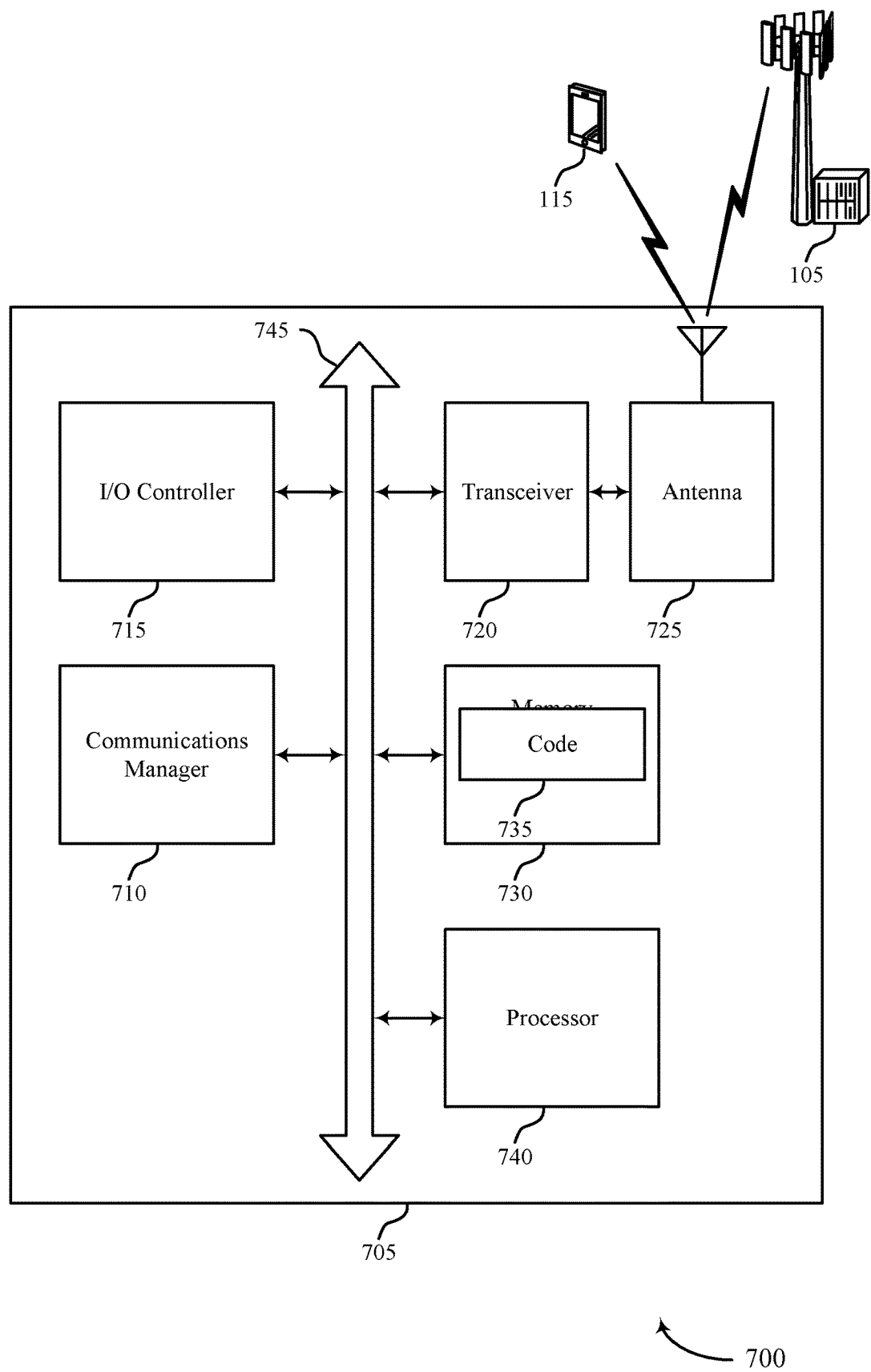
FIG. 7 shows a diagram of a system including a device that supports downlink synchronization for non-terrestrial wireless communications in accordance with aspects of the present disclosure.

FIG. 7 shows a diagram of a system 700 including a device 705 that supports downlink synchronization for non-terrestrial wireless communications in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a first synchronization procedure that is specific to non-terrestrial networks and different from a second synchronization procedure that is specific to terrestrial networks, synchronize with the identified cell by performing the identified synchronization procedure, and identify a cell associated with a non-terrestrial network for synchronization with the UE.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting downlink synchronization for non-terrestrial wireless communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
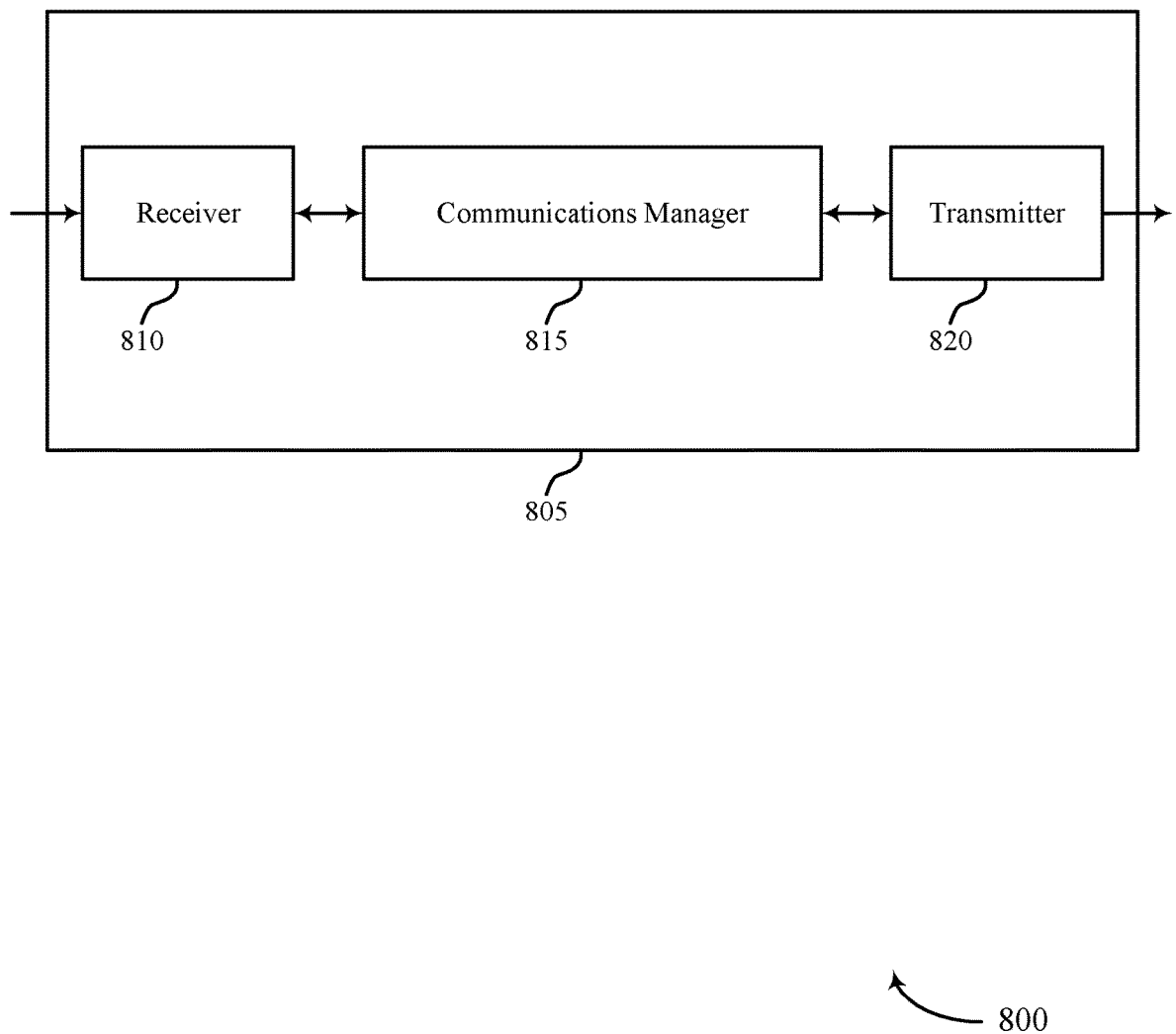
FIGS. 8 and 9 show block diagrams of devices that support downlink synchronization for non-terrestrial wireless communications in accordance with aspects of the present disclosure.

FIG. 8 shows a block diagram 800 of a device 805 that supports downlink synchronization for non-terrestrial wireless communications in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to downlink synchronization for non-terrestrial wireless communications, etc.). Information may be passed on to other components of the device 805. The receiver 810 may be an example of aspects of the transceiver 1120 described with reference to FIG. 11. The receiver 810 may utilize a single antenna or a set of one or more antennas.

The communications manager 815 may identify a first synchronization procedure that is specific to non-terrestrial networks and different from a second synchronization procedure that is specific to terrestrial networks, identify a UE associated with a non-terrestrial network for synchronization with a cell associated with the base station, and synchronize with the identified UE by performing the identified synchronization procedure. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of one or more antennas.

Figure 9:
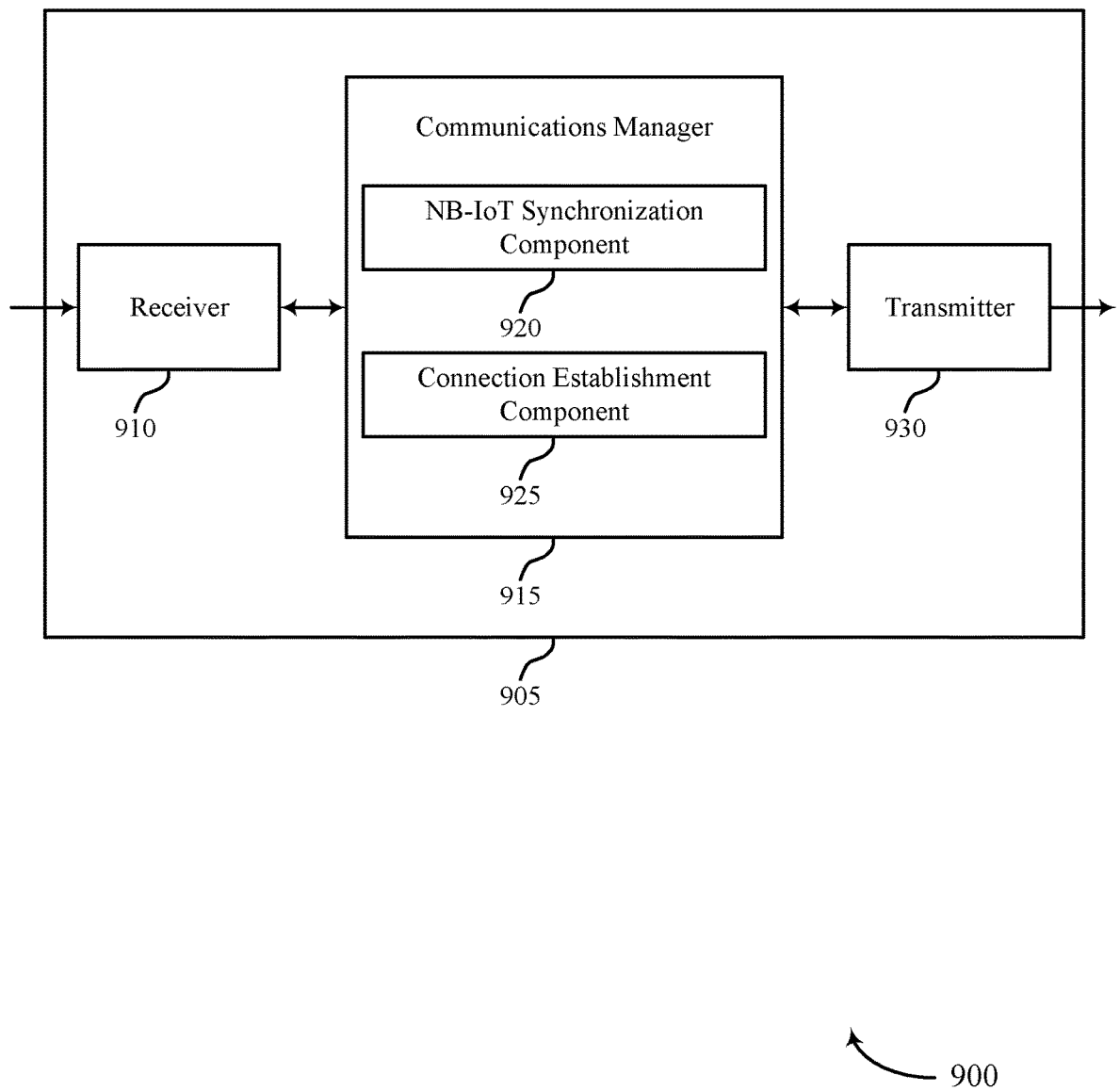

FIG. 9 shows a block diagram 900 of a device 905 that supports downlink synchronization for non-terrestrial wireless communications in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to downlink synchronization for non-terrestrial wireless communications, etc.). Information may be passed on to other components of the device 905. The receiver 910 may be an example of aspects of the transceiver 1120 described with reference to FIG. 11. The receiver 910 may utilize a single antenna or a set of one or more antennas.

The communications manager 915 may be an example of aspects of the communications manager 815 as described herein. The communications manager 915 may include a NB-IoT synchronization component 920 and a connection establishment component 925. The communications manager 915 may be an example of aspects of the communications manager 1110 described herein.

Based on implementing the synchronization techniques as described herein, one or more processors of the device 905 (e.g., processor(s) controlling or incorporated with one or more of receiver 910, communications manager 915, and transmitter 920) may reduce the number of cases where a device incorrectly estimates the NB-IoT carrier frequency associated with a NB cell. In addition, the synchronization techniques may reduce latency and increase communications efficiency in the network by limiting unsuccessful synchronization attempts. In addition, the techniques may allow for a device to more effectively identify if the device has incorrectly locked onto a NB cell.

The NB-IoT synchronization component 920 may identify a first synchronization procedure that is specific to non-terrestrial networks and different from a second synchronization procedure that is specific to terrestrial networks, identify a UE associated with a non-terrestrial network for synchronization with a cell associated with the base station, and synchronize with the identified UE by performing the identified synchronization procedure.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of one or more antennas.

Figure 10:
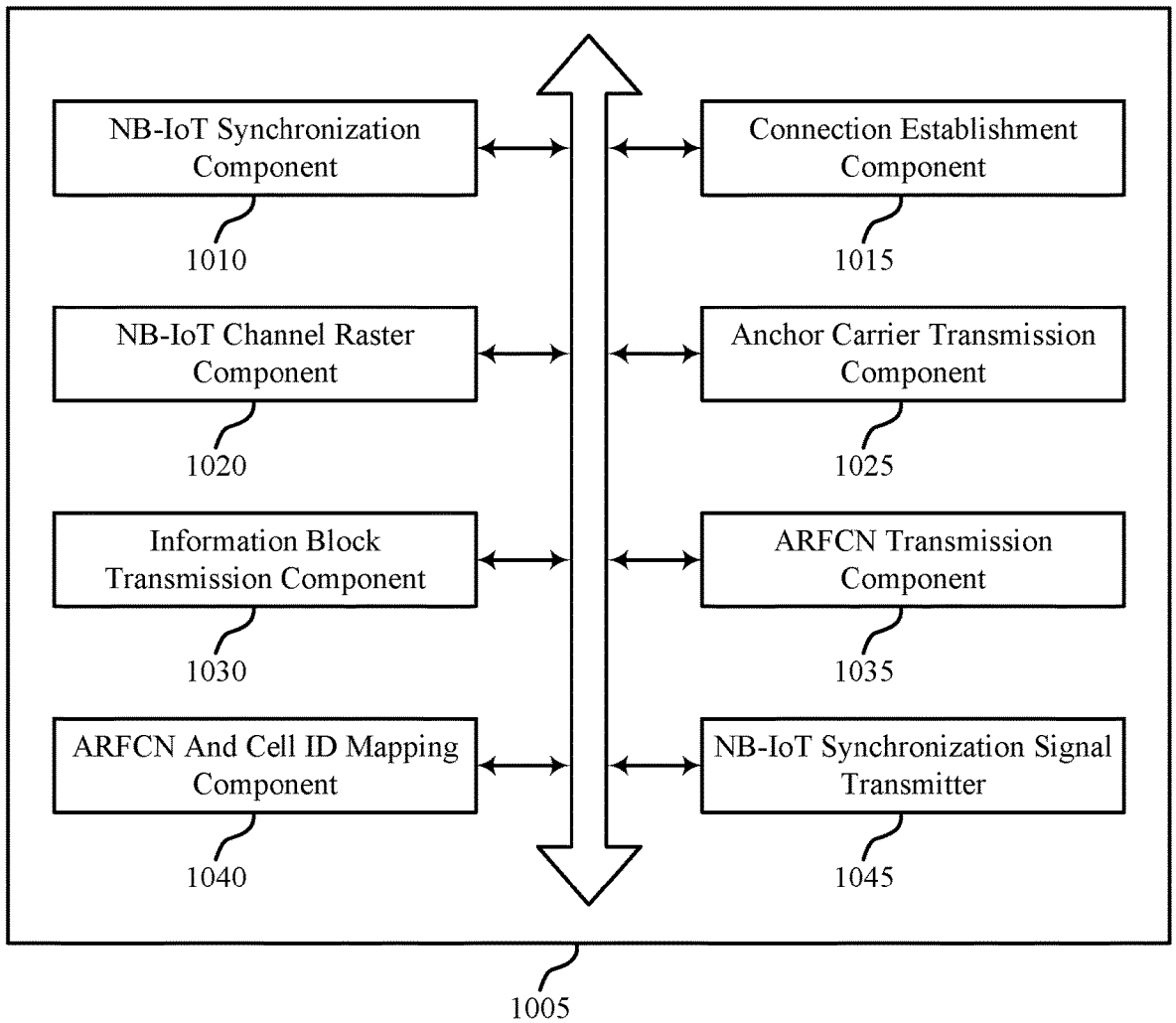
FIG. 10 shows a block diagram of a communications manager that supports downlink synchronization for non-terrestrial wireless communications in accordance with aspects of the present disclosure.

FIG. 10 shows a block diagram 1000 of a communications manager 1005 that supports downlink synchronization for non-terrestrial wireless communications in accordance with aspects of the present disclosure. The communications manager 1005 may be an example of aspects of a communications manager 815, a communications manager 915, or a communications manager 1110 described herein. The communications manager 1005 may include a NB-IoT synchronization component 1010, a connection establishment component 1015, a NB-IoT channel raster component 1020, an anchor carrier transmission component 1025, an information block transmission component 1030, an ARFCN transmission component 1035, an ARFCN and cell ID mapping component 1040, and a NB-IoT synchronization signal transmitter 1045. Each of these modules may communicate, directly or indirectly, with one another (e.g., via one or more buses).

The NB-IoT synchronization component 1010 may identify a first synchronization procedure that is specific to non-terrestrial networks and different from a second synchronization procedure that is specific to terrestrial networks. In some cases, the base station may serve one or more NB-IoT specific UEs.

In some examples, the NB-IoT synchronization component 1010 may identify a UE associated with a non-terrestrial network for synchronization with a cell associated with the base station. In some examples, the NB-IoT synchronization component 1010 may synchronize with the identified UE by performing the identified synchronization procedure.

In some examples, the connection establishment component 1015 may selectively maintain or drop the connection with the UE based on a comparison of a first carrier frequency with a true value of the carrier frequency of the cell. In some examples, the connection establishment component 1015 may maintain the connection with the UE based on the first carrier frequency matching the true value of the carrier frequency. In some examples, the connection establishment component 1015 may drop the connection with the UE based on the first carrier frequency being different from the true value of the anchor carrier frequency.

The NB-IoT channel raster component 1020 may identify a first channel raster in frequency that is specific to non-terrestrial networks and different from a second channel raster in frequency that is specific to the terrestrial networks. In some cases, the first channel raster may include an increased cell carrier spacing in frequency with respect to the second channel raster. The anchor carrier transmission component 1025 may identify a set of one or more frequency locations of at least one anchor carrier in accordance with the first channel raster.

In some examples, the anchor carrier transmission component 1025 may transmit the anchor carrier including one or more downlink synchronization signals, where synchronizing with the UE is based on the one or more downlink synchronization signals.

The information block transmission component 1030 may transmit an information block specific to non-terrestrial networks that includes an indication of the true value of a carrier frequency associated with the cell. The ARFCN transmission component 1035 may transmit at least a portion of an ARFCN for the cell to indicate the true value of the carrier frequency. In some cases, the information block may include a MIB. In some cases, the MIB may include a set of one or more least significant bits of the ARFCN. In some cases, the information block is a SIB including at least a portion of the ARFCN.

The ARFCN and cell ID mapping component 1040 may identify a valid mapping between an ARFCN and the cell ID associated with the cell, and the UE may synchronize with the cell based on the valid mapping. In some examples, the ARFCN and cell ID mapping component 1040 may determine the mapping is a valid mapping that includes a first association between an odd numbered ARFCN and an odd numbered cell ID or a second association between an even numbered ARFCN and an even numbered cell ID, and may maintain the connection with the cell based on the valid mapping.

The NB-IoT synchronization signal transmitter 1045 may transmit one or more synchronization signals associated with the first synchronization procedure, where the one or more synchronization signals include narrow-band synchronization signals.

Figure 11:
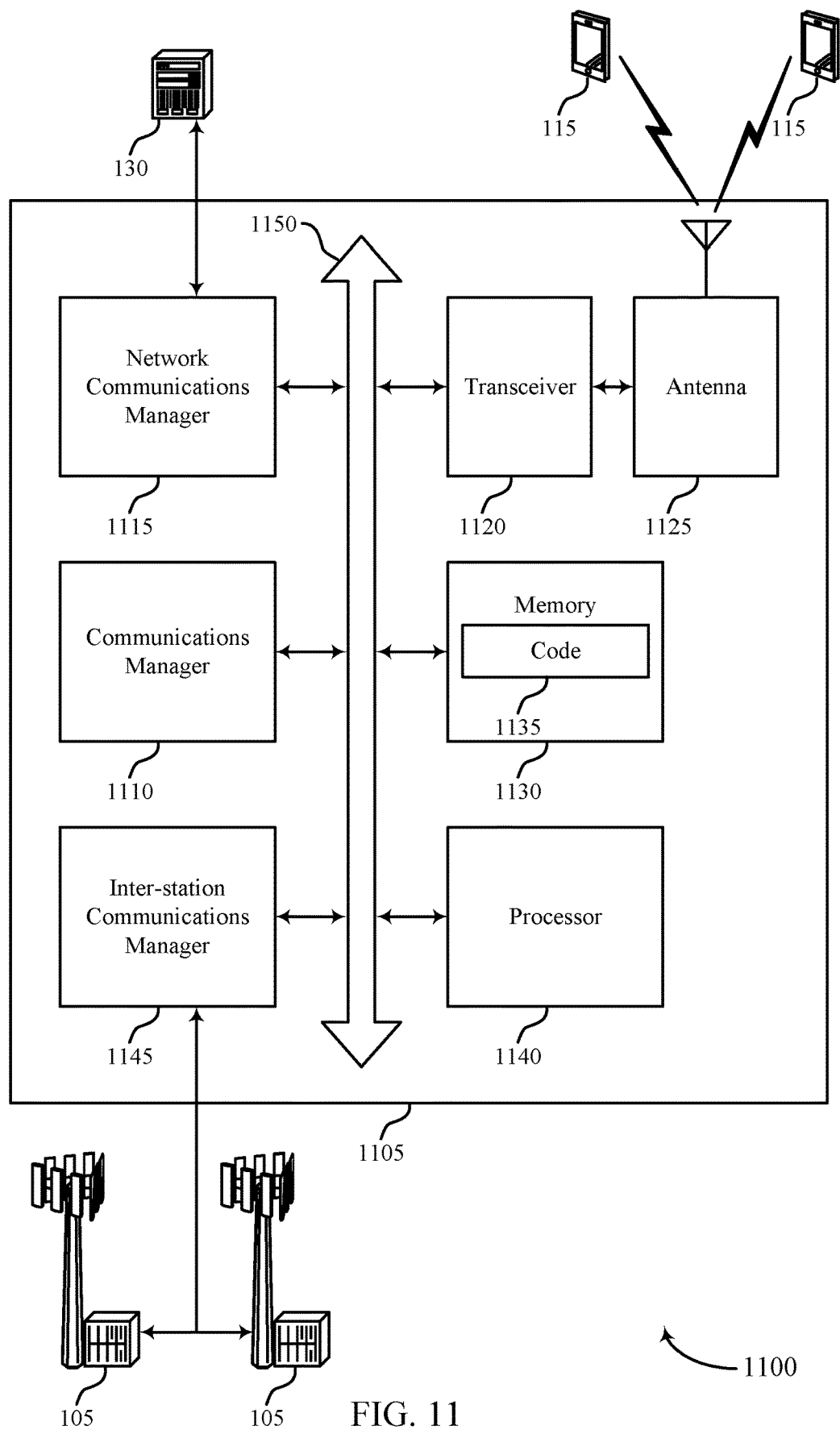
FIG. 11 shows a diagram of a system including a device that supports downlink synchronization for non-terrestrial wireless communications in accordance with aspects of the present disclosure.

FIG. 11 shows a diagram of a system 1100 including a device 1105 that supports downlink synchronization for non-terrestrial wireless communications in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a first synchronization procedure that is specific to non-terrestrial networks and different from a second synchronization procedure that is specific to terrestrial networks, identify a UE associated with a non-terrestrial network for synchronization with a cell associated with the base station, and synchronize with the identified UE by performing the identified synchronization procedure.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting downlink synchronization for non-terrestrial wireless communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
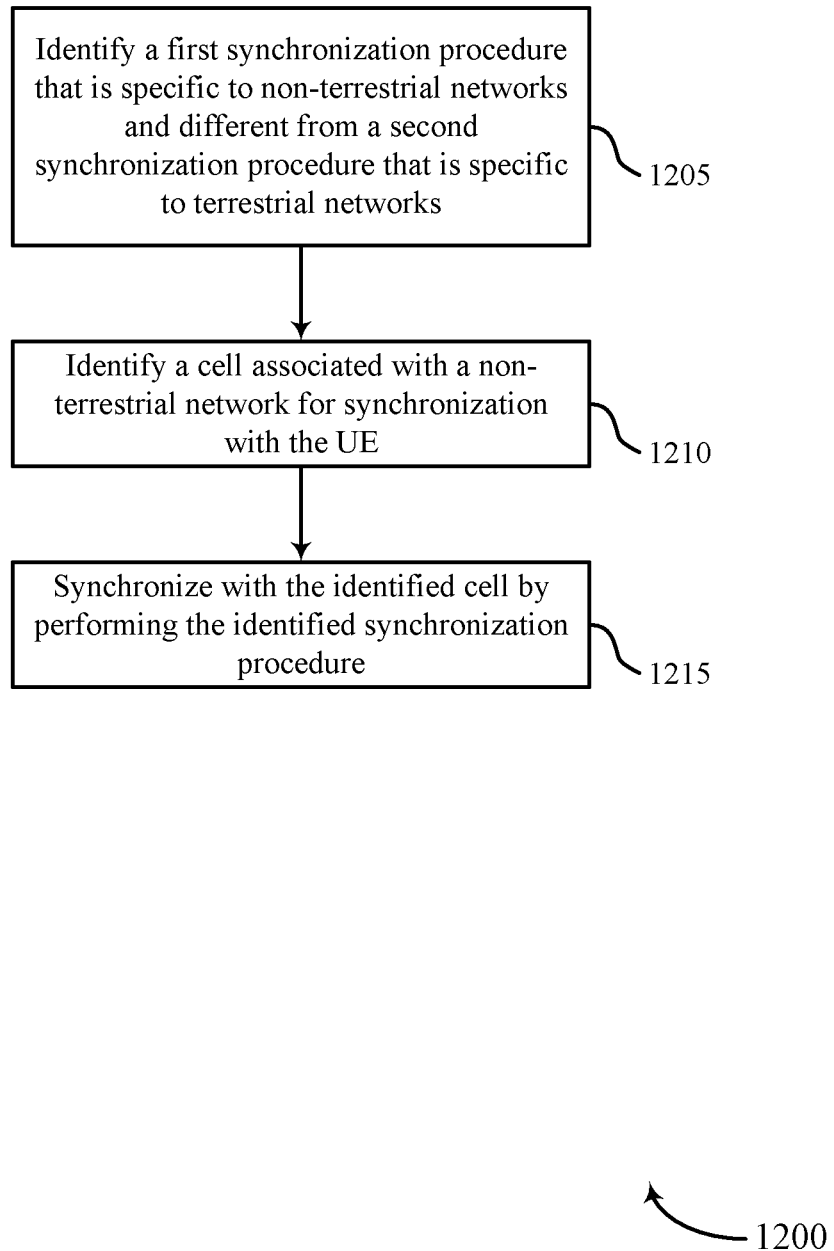
FIGS. 12 through 16 show flowcharts illustrating methods that support downlink synchronization for non-terrestrial wireless communications in accordance with aspects of the present disclosure.

FIG. 12 shows a flowchart illustrating a method 1200 that supports downlink synchronization for non-terrestrial wireless communications in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of one or more instructions to control the functional elements of the UE to perform the functions described herein. Additionally or alternatively, a UE may perform aspects of the functions described herein using special-purpose hardware.

At 1205, the UE may identify a first synchronization procedure that is specific to non-terrestrial networks and different from a second synchronization procedure that is specific to terrestrial networks. The operations of 1205 may be performed according to the methods described herein. In some examples, aspects of the operations of 1205 may be performed by a NB-IoT synchronization component as described with reference to FIGS. 4 through 7.

At 1210, the UE may identify a cell associated with a non-terrestrial network for synchronization with the UE. The operations of 1210 may be performed according to the methods described herein. In some examples, aspects of the operations of 1210 may be performed by a cell identification component as described with reference to FIGS. 4 through 7.

At 1215, the UE may synchronize with the identified cell by performing the identified synchronization procedure. The operations of 1215 may be performed according to the methods described herein. In some examples, aspects of the operations of 1215 may be performed by a NB-IoT synchronization component as described with reference to FIGS. 4 through 7.

Figure 13:
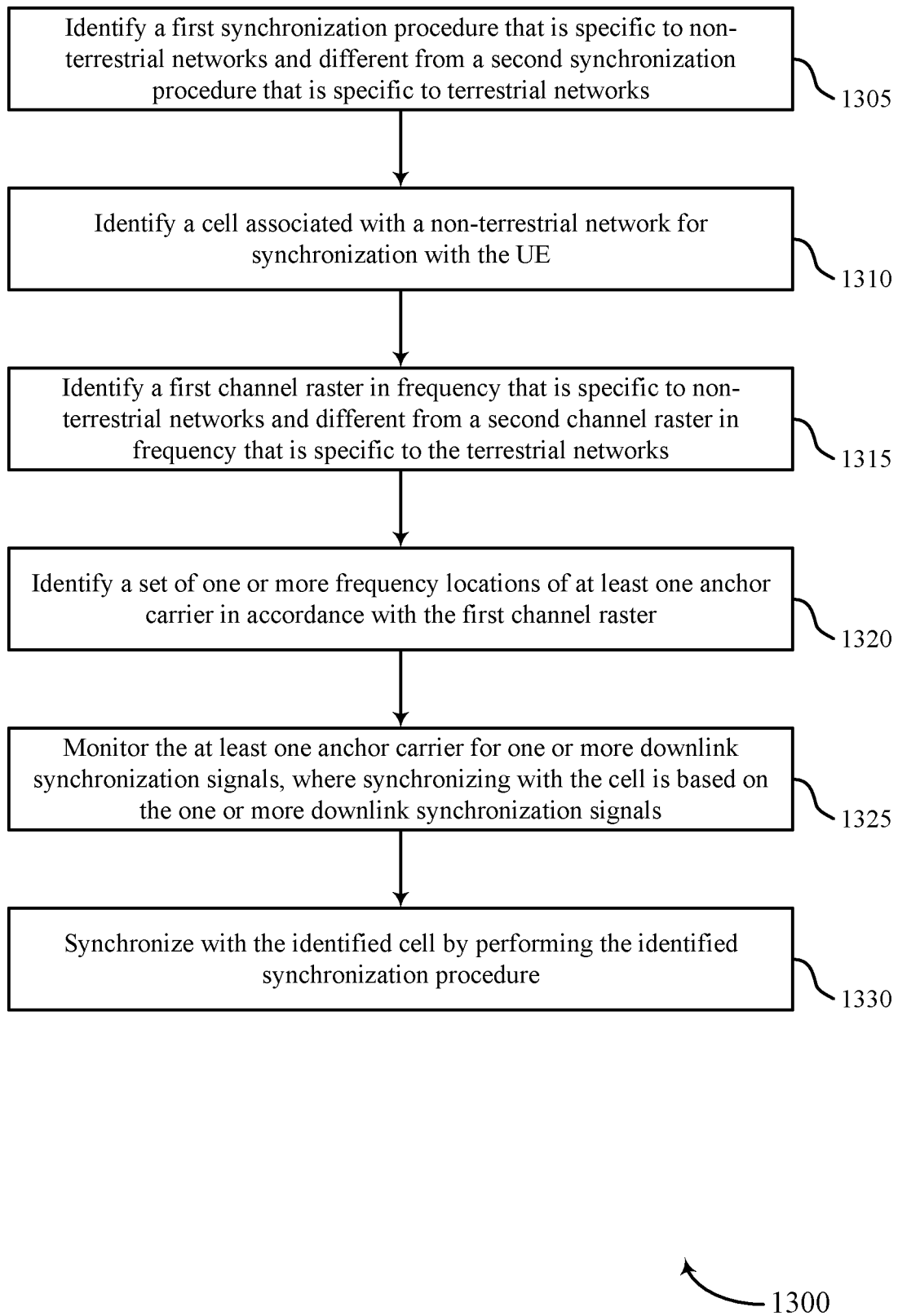

FIG. 13 shows a flowchart illustrating a method 1300 that supports downlink synchronization for non-terrestrial wireless communications in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of one or more instructions to control the functional elements of the UE to perform the functions described herein. Additionally or alternatively, a UE may perform aspects of the functions described herein using special-purpose hardware.

At 1305, the UE may identify a first synchronization procedure that is specific to non-terrestrial networks and different from a second synchronization procedure that is specific to terrestrial networks. The operations of 1305 may be performed according to the methods described herein. In some examples, aspects of the operations of 1305 may be performed by a NB-IoT synchronization component as described with reference to FIGS. 4 through 7.

At 1310, the UE may identify a cell associated with a non-terrestrial network for synchronization with the UE. The operations of 1310 may be performed according to the methods described herein. In some examples, aspects of the operations of 1310 may be performed by a cell identification component as described with reference to FIGS. 4 through 7.

At 1315, the UE may identify a first channel raster in frequency that is specific to non-terrestrial networks and different from a second channel raster in frequency that is specific to the terrestrial networks. The operations of 1315 may be performed according to the methods described herein. In some examples, aspects of the operations of 1315 may be performed by a NB-IoT channel raster component as described with reference to FIGS. 4 through 7.

At 1320, the UE may identify a set of one or more frequency locations of at least one anchor carrier in accordance with the first channel raster. The operations of 1320 may be performed according to the methods described herein. In some examples, aspects of the operations of 1320 may be performed by an anchor carrier monitoring component as described with reference to FIGS. 4 through 7.

At 1325, the UE may monitor the at least one anchor carrier for one or more downlink synchronization signals, where synchronizing with the cell is based on the one or more downlink synchronization signals. The operations of 1325 may be performed according to the methods described herein. In some examples, aspects of the operations of 1325 may be performed by an anchor carrier monitoring component as described with reference to FIGS. 4 through 7.

At 1330, the UE may synchronize with the identified cell by performing the identified synchronization procedure. The operations of 1330 may be performed according to the methods described herein. In some examples, aspects of the operations of 1330 may be performed by a NB-IoT synchronization component as described with reference to FIGS. 4 through 7.

Figure 14:
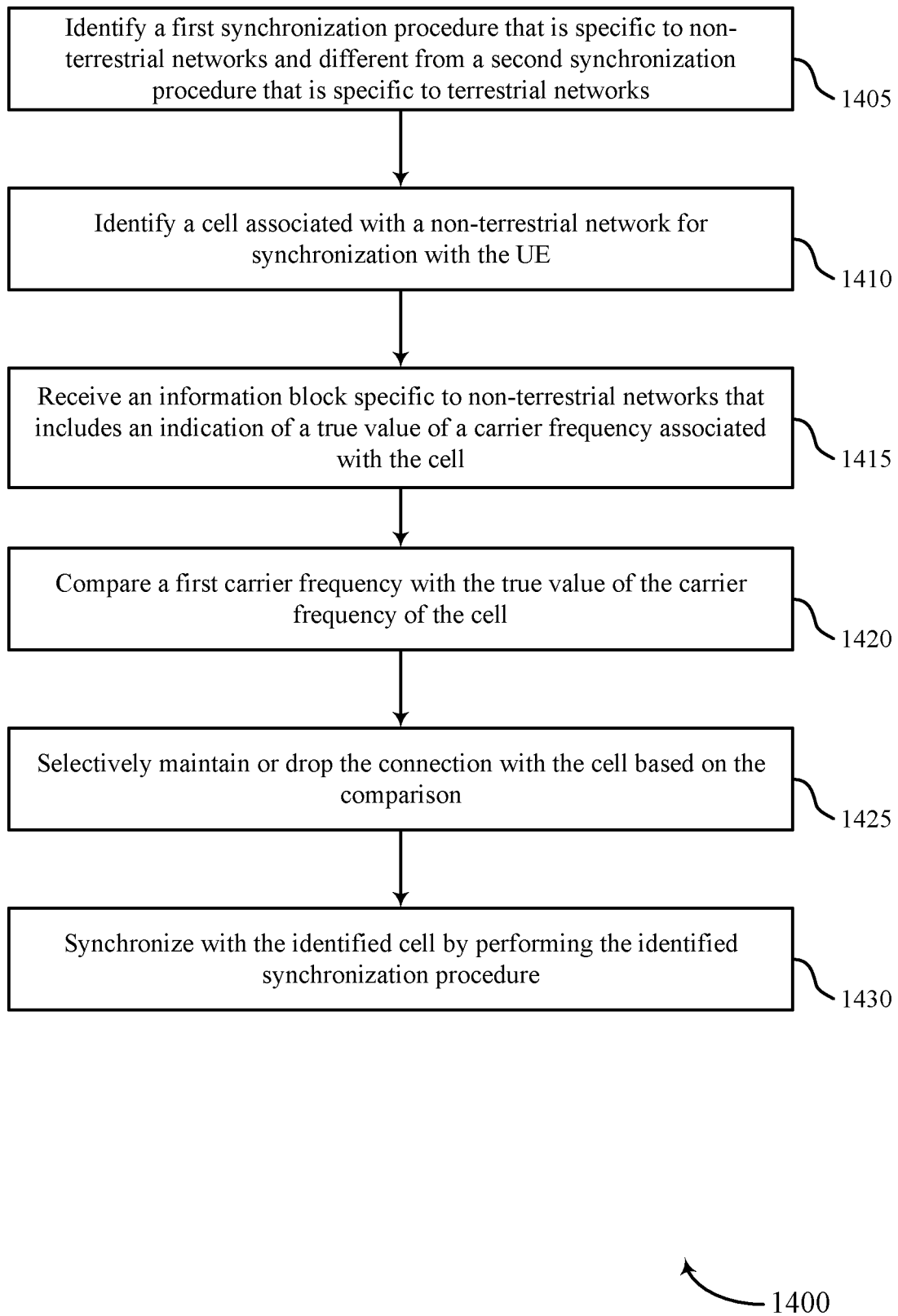

FIG. 14 shows a flowchart illustrating a method 1400 that supports downlink synchronization for non-terrestrial wireless communications in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of one or more instructions to control the functional elements of the UE to perform the functions described herein. Additionally or alternatively, a UE may perform aspects of the functions described herein using special-purpose hardware.

At 1405, the UE may identify a first synchronization procedure that is specific to non-terrestrial networks and different from a second synchronization procedure that is specific to terrestrial networks. The operations of 1405 may be performed according to the methods described herein. In some examples, aspects of the operations of 1405 may be performed by a NB-IoT synchronization component as described with reference to FIGS. 4 through 7.

At 1410, the UE may identify a cell associated with a non-terrestrial network for synchronization with the UE. The operations of 1410 may be performed according to the methods described herein. In some examples, aspects of the operations of 1410 may be performed by a cell identification component as described with reference to FIGS. 4 through 7.

At 1415, the UE may receive an information block specific to non-terrestrial networks that includes an indication of a true value of a carrier frequency associated with the cell. The operations of 1415 may be performed according to the methods described herein. In some examples, aspects of the operations of 1415 may be performed by an information block receiving component as described with reference to FIGS. 4 through 7.

At 1420, the UE may compare a first carrier frequency with the true value of the carrier frequency of the cell. The operations of 1420 may be performed according to the methods described herein. In some examples, aspects of the operations of 1420 may be performed by a frequency comparison component as described with reference to FIGS. 4 through 7.

At 1425, the UE may selectively maintain or drop the connection with the cell based on the comparison. The operations of 1425 may be performed according to the methods described herein. In some examples, aspects of the operations of 1425 may be performed by a connection establishment component as described with reference to FIGS. 4 through 7.

At 1430, the UE may synchronize with the identified cell by performing the identified synchronization procedure. The operations of 1430 may be performed according to the methods described herein. In some examples, aspects of the operations of 1430 may be performed by a NB-IoT synchronization component as described with reference to FIGS. 4 through 7.

Figure 15:
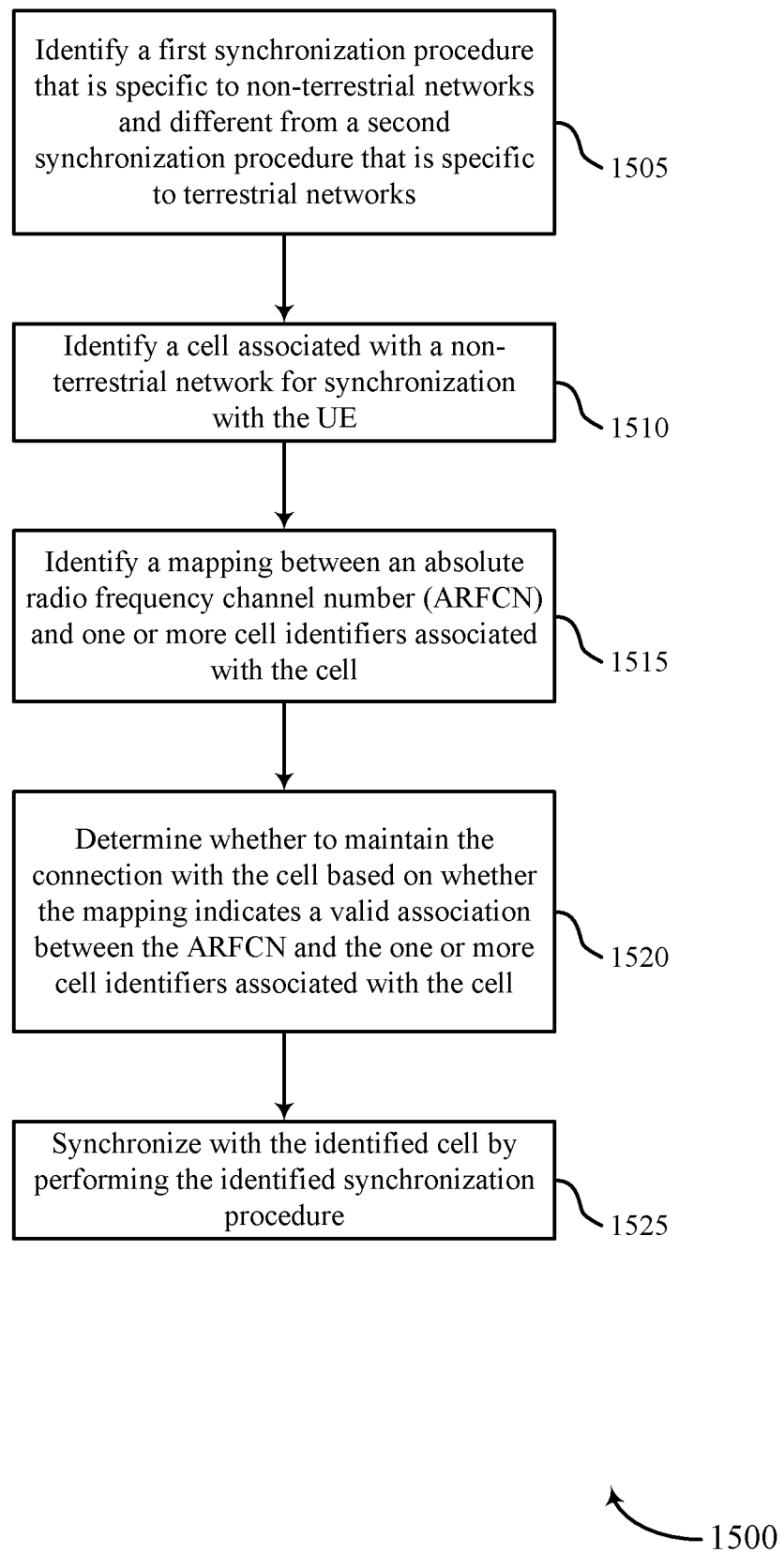

FIG. 15 shows a flowchart illustrating a method 1500 that supports downlink synchronization for non-terrestrial wireless communications in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of one or more instructions to control the functional elements of the UE to perform the functions described herein. Additionally or alternatively, a UE may perform aspects of the functions described herein using special-purpose hardware.

At 1505, the UE may identify a first synchronization procedure that is specific to non-terrestrial networks and different from a second synchronization procedure that is specific to terrestrial networks. The operations of 1505 may be performed according to the methods described herein. In some examples, aspects of the operations of 1505 may be performed by a NB-IoT synchronization component as described with reference to FIGS. 4 through 7.

At 1510, the UE may identify a cell associated with a non-terrestrial network for synchronization with the UE. The operations of 1510 may be performed according to the methods described herein. In some examples, aspects of the operations of 1510 may be performed by a cell identification component as described with reference to FIGS. 4 through 7.

At 1515, the UE may identify a valid mapping between an ARFCN and a cell ID associated with the cell. The operations of 1515 may be performed according to the methods described herein. In some examples, aspects of the operations of 1515 may be performed by an ARFCN and cell ID mapping component as described with reference to FIGS. 4 through 7.

At 1520, the UE may determine synchronize with the cell based on the valid mapping, for example, a mapping that includes a first association between an odd numbered ARFCN and an odd numbered cell ID or a second association between an even numbered ARFCN and an even numbered cell ID. The operations of 1520 may be performed according to the methods described herein. In some examples, aspects of the operations of 1520 may be performed by a undefined as described with reference to FIGS. 4 through 7.

At 1525, the UE may synchronize with the identified cell by performing the identified synchronization procedure. The operations of 1525 may be performed according to the methods described herein. In some examples, aspects of the operations of 1525 may be performed by a NB-IoT synchronization component as described with reference to FIGS. 4 through 7.

Figure 16:
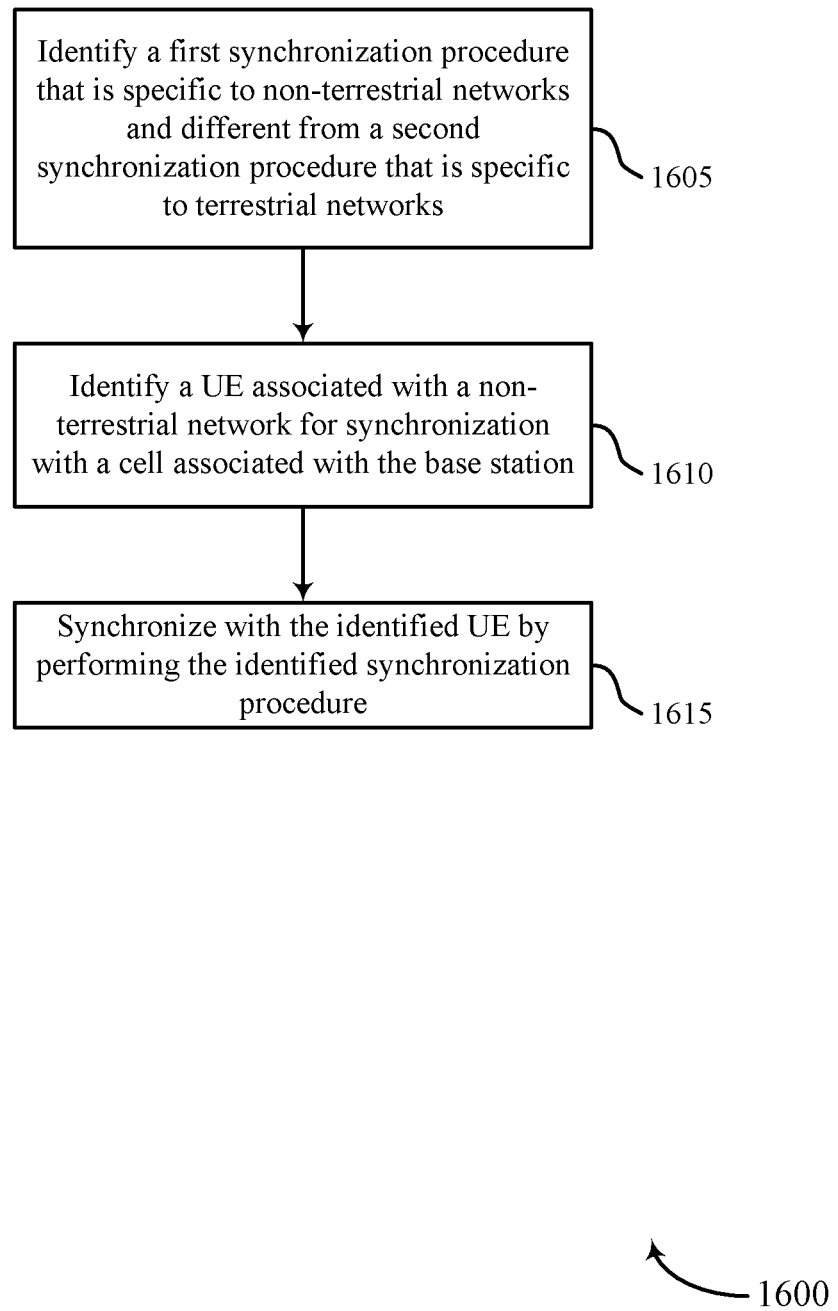

FIG. 16 shows a flowchart illustrating a method 1600 that supports downlink synchronization for non-terrestrial wireless communications in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of one or more instructions to control the functional elements of the base station to perform the functions described herein. Additionally or alternatively, a base station may perform aspects of the functions described herein using special-purpose hardware.

At 1605, the base station may identify a first synchronization procedure that is specific to non-terrestrial networks and different from a second synchronization procedure that is specific to terrestrial networks. The operations of 1605 may be performed according to the methods described herein. In some examples, aspects of the operations of 1605 may be performed by a NB-IoT synchronization component as described with reference to FIGS. 8 through 11.

At 1610, the base station may identify a UE associated with a non-terrestrial network for synchronization with a cell associated with the base station. The operations of 1610 may be performed according to the methods described herein. In some examples, aspects of the operations of 1610 may be performed by a NB-IoT synchronization component as described with reference to FIGS. 8 through 11.

At 1615, the base station may synchronize with the identified UE by performing the identified synchronization procedure. The operations of 1615 may be performed according to the methods described herein. In some examples, aspects of the operations of 1615 may be performed by a NB-IoT synchronization component as described with reference to FIGS. 8 through 11.

The following provides an overview of aspects of the present disclosure:

Aspect 1: A method for wireless communications at a user equipment (UE), comprising: identifying a first synchronization procedure that is specific to non-terrestrial networks and different from a second synchronization procedure that is specific to terrestrial networks; identifying a cell associated with a non-terrestrial network for synchronization with the UE; and synchronizing with the identified cell by performing the identified synchronization procedure.

Aspect 2: The method of aspect 1, wherein identifying the first synchronization procedure comprises: identifying a first channel raster in frequency that is specific to non-terrestrial networks and different from a second channel raster in frequency that is specific to the terrestrial networks; identifying a set of one or more frequency locations of at least one anchor carrier in accordance with the first channel raster; and monitoring the at least one anchor carrier for one or more downlink synchronization signals, wherein synchronizing with the cell is based at least in part on the one or more downlink synchronization signals.

Aspect 3: The method of aspect 2, wherein the first channel raster comprises an increased cell carrier spacing in frequency with respect to the second channel raster.

Aspect 4: The method of any of aspects 1 through 3, further comprising: receiving an information block specific to non-terrestrial networks that comprises an indication of a true value of a carrier frequency associated with the cell.

Aspect 5: The method of aspect 4, further comprising: comparing a first carrier frequency with the true value of the carrier frequency of the cell; and selectively maintaining or dropping a connection with the cell based at least in part on the comparison.

Aspect 6: The method of aspect 5, wherein selectively maintaining or dropping the connection with the cell comprises: determining that the first carrier frequency matches the true value of the carrier frequency of the cell; and maintaining the connection with the cell based at least in part on the first carrier frequency matching the true value of the carrier frequency.

Aspect 7: The method of any of aspects 5 through 6, wherein determining whether to maintain the connection with the cell comprises: determining that the first carrier frequency is different from the true value of the carrier frequency of the cell; and dropping the connection with the cell based at least in part on the first carrier frequency being different from the true value of the carrier frequency.

Aspect 8: The method of any of aspects 4 through 7, wherein the information block comprising the indication of the true value of the carrier frequency further comprises at least a portion of an absolute radio frequency channel number (ARFCN) for the cell.

Aspect 9: The method of aspect 8, wherein the information block is an SIB comprising at least the portion of the ARFCN.

Aspect 10: The method of any of aspects 4 through 9, wherein the information block comprises a master information block (MIB).

Aspect 11: The method of aspect 10, wherein the MIB comprises a plurality of least significant bits of the ARFCN.

Aspect 12: The method of any of aspects 1 through 11, further comprising: identifying a valid mapping between an absolute radio frequency channel number (ARFCN) and a cell identifier (ID) associated with the cell, wherein synchronizing with the identified cell is based at least in part on the valid mapping.

Aspect 13: The method of aspect 12, further comprising: determining that the valid mapping comprises a first association between an odd numbered ARFCN and an odd numbered cell ID or a second association between an even numbered ARFCN and an even numbered cell ID.

Aspect 14: The method of any of aspects 1 through 13, further comprising: receiving one or more synchronization signals associated with the first synchronization procedure, wherein the one or more synchronization signals comprise narrow-band synchronization signals.

Aspect 15: The method of any of aspects 1 through 14, wherein the cell is a narrowband cell that serves one or more narrowband (NB) internet of things (IoT) specific UEs.

Aspect 16: A method for wireless communications at a base station, comprising: identifying a first synchronization procedure that is specific to non-terrestrial networks and different from a second synchronization procedure that is specific to terrestrial networks; identifying a UE associated with a non-terrestrial network for synchronization with a cell associated with the base station; and synchronizing with the identified UE by performing the identified synchronization procedure.

Aspect 17: The method of aspect 16, wherein identifying the first synchronization procedure comprises: identifying a first channel raster in frequency that is specific to non-terrestrial networks and different from a second channel raster in frequency that is specific to the terrestrial networks; identifying a set of one or more frequency locations of at least one anchor carrier in accordance with the first channel raster; and transmitting the at least one anchor carrier comprising one or more downlink synchronization signals, wherein synchronizing with the UE is based at least in part on the one or more downlink synchronization signals.

Aspect 18: The method of aspect 17, wherein the first channel raster comprises an increased cell carrier spacing in frequency with respect to the second channel raster.

Aspect 19: The method of any of aspects 16 through 18, further comprising: transmitting an information block specific to non-terrestrial networks that comprises an indication of a true value of a first carrier frequency associated with the cell.

Aspect 20: The method of aspect 19, further comprising: compare a first carrier frequency with the true value of the carrier frequency of the cell; and selectively maintaining or dropping a connection with the UE based at least in part on a comparison of the first carrier frequency with the true value of the carrier frequency of the cell.

Aspect 21: The method of aspect 20, wherein selectively maintaining or dropping the connection with the cell comprises: maintaining the connection with the UE based at least in part on the first carrier frequency matching the true value of the carrier frequency.

Aspect 22: The method of any of aspects 20 through 21, wherein determining whether to maintain the connection with the cell comprises: dropping the connection with the UE based at least in part on the first carrier frequency being different from the true value of the carrier frequency.

Aspect 23: The method of any of aspects 19 through 22, further comprising: transmitting the information block further comprising at least a portion of an absolute radio frequency channel number (ARFCN) for the cell to indicate the true value of the carrier frequency.

Aspect 24: The method of any of aspects 19 through 23, wherein the information block comprises a master information block (MIB), the MIB comprising a plurality of least significant bits of the ARFCN.

Aspect 25: The method of any of aspects 19 through 24, wherein the information block is an SIB comprising the ARFCN.

Aspect 26: The method of any of aspects 16 through 25, further comprising: identifying a valid mapping between an absolute radio frequency channel number (ARFCN) and a cell identifier (ID) associated with the cell, wherein synchronizing with the UE is based at least in part on the valid mapping; and determining that the valid mapping comprises a first association between an odd numbered ARFCN and an odd numbered cell ID or a second association between an even numbered ARFCN and an even numbered cell ID.

Aspect 27: The method of any of aspects 16 through 26, further comprising: transmitting one or more synchronization signals associated with the first synchronization procedure, wherein the one or more synchronization signals comprise narrow-band synchronization signals.

Aspect 28: The method of any of aspects 16 through 27, wherein the base station serves one or more narrowband (NB) internet of things (IoT) specific UEs.

Aspect 29: An apparatus for wireless communications at a UE, comprising a processor; memory coupled with the processor; and instructions stored in the memory and executable by the processor to cause the apparatus to perform a method of any of aspects 1 through 15.

Aspect 30: An apparatus for wireless communications at a UE, comprising at least one means for performing a method of any of aspects 1 through 15.

Aspect 31: A non-transitory computer-readable medium storing code for wireless communications at a UE, the code comprising instructions executable by a processor to perform a method of any of aspects 1 through 15.

Aspect 32: An apparatus for wireless communications at a base station, comprising a processor; memory coupled with the processor; and instructions stored in the memory and executable by the processor to cause the apparatus to perform a method of any of aspects 16 through 28.

Aspect 33: An apparatus for wireless communications at a base station, comprising at least one means for performing a method of any of aspects 16 through 28.

Aspect 34: A non-transitory computer-readable medium storing code for wireless communications at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of one or more conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
a processor,
memory coupled with the processor; and
instructions stored in the memory and executable by the processor to cause the apparatus to:
identify a first synchronization procedure that is specific to non-terrestrial networks and different from a second synchronization procedure that is specific to terrestrial networks;
identify a cell associated with a non-terrestrial network for synchronization with the UE; and
synchronize with the identified cell by performing the identified synchronization procedure.

2. The apparatus of claim 1, wherein the instructions to identify the first synchronization procedure are executable by the processor to cause the apparatus to:
identify a first channel raster in frequency that is specific to non-terrestrial networks and different from a second channel raster in frequency that is specific to the terrestrial networks;
identify a set of one or more frequency locations of at least one anchor carrier in accordance with the first channel raster; and
monitor the at least one anchor carrier for one or more downlink synchronization signals, wherein synchronizing with the cell is based at least in part on the one or more downlink synchronization signals.

3. The apparatus of claim 2, wherein the first channel raster comprises an increased cell carrier spacing in frequency with respect to the second channel raster.

4. The apparatus of claim 1, wherein the instructions are further executable by the processor to cause the apparatus to:
receive an information block specific to non-terrestrial networks that comprises an indication of a true value of a carrier frequency associated with the cell.

5. The apparatus of claim 4, wherein the instructions are further executable by the processor to cause the apparatus to:
compare a first carrier frequency with the true value of the carrier frequency of the cell; and
selectively maintain or drop a connection with the cell based at least in part on the comparison.

6. The apparatus of claim 5, wherein the instructions to selectively maintaining or dropping the connection with the cell are executable by the processor to cause the apparatus to:
determine that the first carrier frequency matches the true value of the carrier frequency of the cell; and
maintain the connection with the cell based at least in part on the first carrier frequency matching the true value of the carrier frequency.

7. The apparatus of claim 5, wherein the instructions to determine whether to maintain the connection with the cell are executable by the processor to cause the apparatus to:
determine that the first carrier frequency is different from the true value of the carrier frequency of the cell; and
drop the connection with the cell based at least in part on the first carrier frequency being different from the true value of the carrier frequency.

8. The apparatus of claim 4, wherein the information block comprising the indication of the true value of the carrier frequency further comprises at least a portion of an absolute radio frequency channel number (ARFCN) for the cell.

9. The apparatus of claim 8, wherein the information block is a system information block (SIB) comprising at least the portion of the ARFCN.

10. The apparatus of claim 8, wherein the information block comprises a master information block (MIB).

11. The apparatus of claim 10, wherein the MIB comprises a plurality of least significant bits of the ARFCN.

12. The apparatus of claim 1, wherein the instructions are further executable by the processor to cause the apparatus to:
identify a valid mapping between an absolute radio frequency channel number (ARFCN) and a cell identifier (ID) associated with the cell, wherein the synchronizing with the identified cell is based at least in part on the valid mapping.

13. The apparatus of claim 12, wherein the instructions are further executable by the processor to cause the apparatus to:
determine that the valid mapping comprises a first association between an odd numbered ARFCN and an odd numbered cell ID or a second association between an even numbered ARFCN and an even numbered cell ID.

14. The apparatus of claim 1, wherein the instructions are further executable by the processor to cause the apparatus to:

receive one or more synchronization signals associated with the first synchronization procedure, wherein the one or more synchronization signals comprise narrowband synchronization signals.

15. The apparatus of claim 1, wherein the cell is a narrowband cell that serves one or more narrowband (NB) internet of things (IoT) specific UEs.

16. An apparatus for wireless communications at a base station, comprising:
a processor,
memory coupled with the processor; and
instructions stored in the memory and executable by the processor to cause the apparatus to:
identify a first synchronization procedure that is specific to non-terrestrial networks and different from a second synchronization procedure that is specific to terrestrial networks;
identify a user equipment (UE) associated with a non-terrestrial network for synchronization with a cell associated with the base station; and
synchronize with the identified UE by performing the identified synchronization procedure.

17. The apparatus of claim 16, wherein the instructions to identify the first synchronization procedure are executable by the processor to cause the apparatus to:
identify a first channel raster in frequency that is specific to non-terrestrial networks and different from a second channel raster in frequency that is specific to the terrestrial networks;
identify a set of one or more frequency locations of at least one anchor carrier in accordance with the first channel raster; and
transmit the at least one anchor carrier comprising one or more downlink synchronization signals, wherein synchronizing with the UE is based at least in part on the one or more downlink synchronization signals.

18. The apparatus of claim 17, wherein the first channel raster comprises an increased cell carrier spacing in frequency with respect to the second channel raster.

19. The apparatus of claim 16, wherein the instructions are further executable by the processor to cause the apparatus to:
transmit an information block specific to non-terrestrial networks that comprises an indication of a true value of a carrier frequency associated with the cell.

20. The apparatus of claim 19, wherein the instructions are further executable by the processor to cause the apparatus to:
compare a first carrier frequency with the true value of the carrier frequency of the cell; and
selectively maintain or drop a connection with the UE based at least in part on a comparison of the first carrier frequency with the true value of the carrier frequency of the cell.

21. The apparatus of claim 20, wherein the instructions to selectively maintaining or dropping the connection with the cell are executable by the processor to cause the apparatus to:
maintain the connection with the UE based at least in part on the first carrier frequency matching the true value of the carrier frequency.

22. The apparatus of claim 20, wherein the instructions to determine whether to maintain the connection with the cell are executable by the processor to cause the apparatus to:
drop the connection with the UE based at least in part on the first carrier frequency being different from the true value of the carrier frequency.

23. The apparatus of claim 19, wherein the instructions are further executable by the processor to cause the apparatus to:
transmit the information block further comprising at least a portion of an absolute radio frequency channel number (ARFCN) for the cell to indicate the true value of the carrier frequency.

24. The apparatus of claim 23, wherein the information block comprises a master information block (MIB), the MIB comprising a plurality of least significant bits of the ARFCN.

25. The apparatus of claim 23, wherein the information block is a system information block (SIB) comprising the at least the portion of the ARFCN.

26. The apparatus of claim 16, wherein the instructions are further executable by the processor to cause the apparatus to:
identify a valid mapping between an absolute radio frequency channel number (ARFCN) and a cell identifier (ID), wherein synchronizing with the UE is based at least in part on the valid mapping; and
determine that the valid mapping comprises a first association between an odd numbered ARFCN and an odd numbered cell ID or a second association between an even numbered ARFCN and an even numbered cell ID.

27. The apparatus of claim 16, wherein the instructions are further executable by the processor to cause the apparatus to:
transmit one or more synchronization signals associated with the first synchronization procedure, wherein the one or more synchronization signals comprise narrowband synchronization signals.

28. The apparatus of claim 16, wherein the base station serves one or more narrowband (NB) internet of things (IoT) specific UEs.

29. A method for wireless communications at a user equipment (UE), comprising:
identifying a first synchronization procedure that is specific to non-terrestrial networks and different from a second synchronization procedure that is specific to terrestrial networks;
identifying a cell associated with a non-terrestrial network for synchronization with the UE; and
synchronizing with the identified cell by performing the identified synchronization procedure.

30. A method for wireless communications at a base station, comprising:
identifying a first synchronization procedure that is specific to non-terrestrial networks and different from a second synchronization procedure that is specific to terrestrial networks;
identifying a user equipment (UE) associated with a non-terrestrial network for synchronization with a cell associated with the base station; and
synchronizing with the identified UE by performing the identified synchronization procedure.

* * * * *